United States Patent
Kim et al.

(10) Patent No.: US 11,026,070 B2
(45) Date of Patent: Jun. 1, 2021

(54) METHOD FOR PERFORMING V2X COMMUNICATION IN WIRELESS COMMUNICATION SYSTEM AND APPARATUS FOR SAME

(71) Applicant: LG ELECTRONICS INC., Seoul (KR)

(72) Inventors: Taehun Kim, Seoul (KR); Jaewook Lee, Seoul (KR); Jongwoo Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/736,697

(22) Filed: Jan. 7, 2020

(65) Prior Publication Data

US 2020/0245110 A1    Jul. 30, 2020

Related U.S. Application Data

(63) Continuation of application No. 16/132,299, filed on Sep. 14, 2018, now Pat. No. 10,542,399.

(Continued)

(51) Int. Cl.
*H04W 4/40* (2018.01)
*H04L 1/00* (2006.01)
(Continued)

(52) U.S. Cl.
CPC ............. *H04W 4/40* (2018.02); *H04L 1/0003* (2013.01); *H04L 1/0025* (2013.01);
(Continued)

(58) Field of Classification Search
CPC ....... H04W 4/40; H04W 76/11; H04W 76/27; H04W 72/0453; H04W 80/08;
(Continued)

(56) References Cited

U.S. PATENT DOCUMENTS

| 10,542,399 B2* | 1/2020 | Kim ..................... H04W 76/11 |
| 2006/0013182 A1* | 1/2006 | Balasubramanian ... H04L 5/026 |
| | | 370/343 |

(Continued)

FOREIGN PATENT DOCUMENTS

| WO | 2017011039 | 1/2017 | |
| WO | 2017135028 | 8/2017 | |
| WO | WO-2017135028 A1 * | 8/2017 | ............. H04W 4/40 |

OTHER PUBLICATIONS

3GPP TR 36.885 v14.0.0 (Jun. 2016) discloses 3rd Generation Partnership Project; Technical Specification Group Radio Access Network; Study on LTE-based V2X Services; (Release 14) (Year: 2016).*

(Continued)

*Primary Examiner* — Brandon J Miller
(74) *Attorney, Agent, or Firm* — Lee, Hong, Degerman, Kang & Waimey

(57) ABSTRACT

Disclosed are a method for performing V2X communication in a wireless communication system and an apparatus for the same. Specifically, a method for performing vehicle-to-everything (V2X) communication by a user equipment (UE) in a wireless communication system includes: receiving a transmission request of a V2X message of a V2X service identified by a V2X service identifier from an upper layer by using V2X communication through a PC5 interface, the transmission request including the V2X message and the V2X service identifier; requesting or selecting a resource for the V2X communication through the PC5 interface to a base station based on whether the UE is serviced by an evolved universal terrestrial radio access network (E-UTRAN) for the V2X communication; and transmitting the V2X message through the PC5 interface by transferring the V2X message to a lower layer, and when mapping between the V2X service identifier and a transmission parameter is configured, (Continued)

the transmission parameter associated with the V2X service identifier may be transferred to the lower layer together with the V2X message.

15 Claims, 12 Drawing Sheets

Related U.S. Application Data

(60) Provisional application No. 62/558,393, filed on Sep. 14, 2017, provisional application No. 62/563,657, filed on Sep. 27, 2017, provisional application No. 62/567,242, filed on Oct. 3, 2017.

(51) Int. Cl.
| | |
|---|---|
| *H04W 76/11* | (2018.01) |
| *H04W 76/27* | (2018.01) |
| *H04W 72/04* | (2009.01) |
| *H04W 80/08* | (2009.01) |
| *H04L 5/00* | (2006.01) |
| *H04W 84/04* | (2009.01) |
| *H04W 92/18* | (2009.01) |

(52) U.S. Cl.
CPC ........ *H04W 72/0453* (2013.01); *H04W 76/11* (2018.02); *H04W 76/27* (2018.02); *H04W 80/08* (2013.01); *H04L 5/003* (2013.01); *H04L 5/0094* (2013.01); *H04W 84/042* (2013.01); *H04W 92/18* (2013.01)

(58) Field of Classification Search
CPC .. H04W 84/042; H04W 92/18; H04L 1/0003; H04L 1/0025; H04L 5/003; H04L 5/0094
See application file for complete search history.

(56) References Cited

U.S. PATENT DOCUMENTS

| | | | |
|---|---|---|---|
| 2017/0086081 A1 | 3/2017 | Kim et al. | |
| 2018/0098322 A1 | 4/2018 | Yoon | |
| 2018/0132208 A1* | 5/2018 | Pan | H04W 72/0406 |
| 2018/0295655 A1* | 10/2018 | Cavalcanti | H04W 4/40 |
| 2019/0090107 A1 | 3/2019 | Kim et al. | |

OTHER PUBLICATIONS

PCT International Application No. PCT/KR2018/010786, International Search Report dated Jan. 7, 2019, 3 pages.
3rd Generation Partnership Project (3GPP), "Technical Specification Group Core Network and Terminals; User Equipment (UE) to V2X control function; protocol aspects; Stage 3 (Release 14)," 3GPP TS 24.386 V14.1.0, Jun. 2017, 35 pages.
ZTE, "Discussion on support of 64QAM over sidelink", 3GPP TSG RAN WG2 Meeting #99, R2-1708512, Aug. 2017, 5 pages.
Samsung, "High order modulation in V2X", 3GPP TSG RAN WG1 Meeting #90, R1-1713529, Aug. 2017, 5 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.3.0, Jun. 2017, 333 pages.
U.S. Appl. No. 16/132,299, Notice of Allowance dated Apr. 5, 2019, 13 pages.
3rd Generation Partnership Project (3GPP), "Technical Specification Group Radio Access Network; Study on LTE-based V2X Services (Release 14)," 3GPP TR 36.885, Jun. 2016, 217 pages.
European patent application No. 18856429.8, European search report dated Jun. 29, 2020, 10 pages.
Japan Patent Office Application No. 2020-515033, Office Action dated Apr. 13, 2021, 4 pages.
3rd Generation Partnership Project; "Technical Specification Group Radio Access Network; Evolved Universal Terrestrial Radio Access (E-UTRA); Physical layer procedures (Release 14)," 3GPP TS 36.213 V14.3.0, Jun. 2017, 6 pages.

* cited by examiner

[FIG. 1]
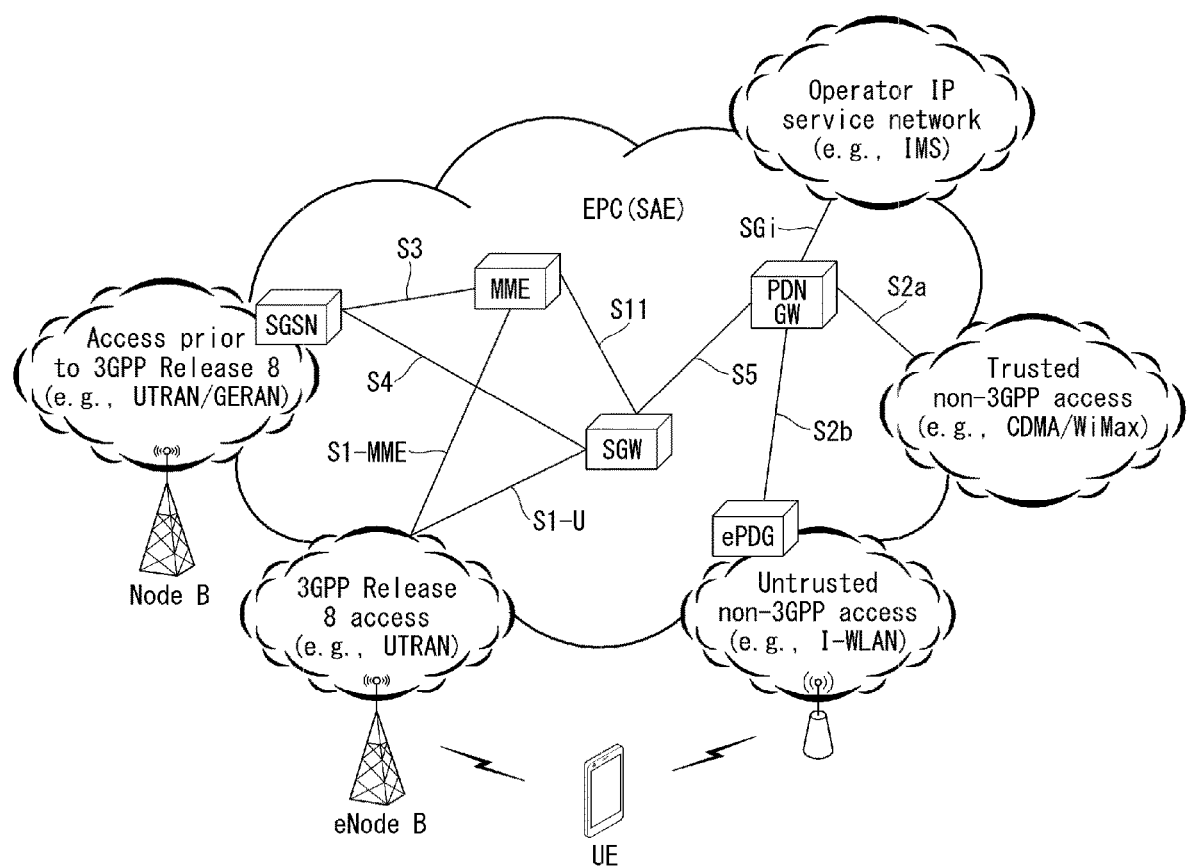

[FIG. 2]
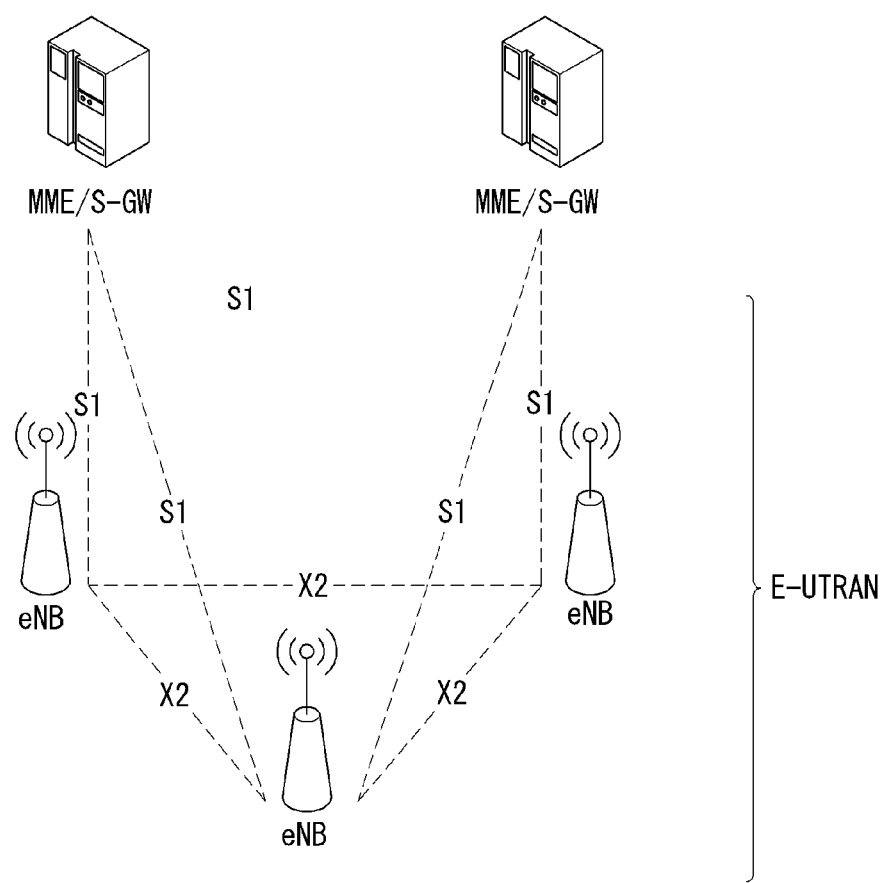

[FIG. 3]
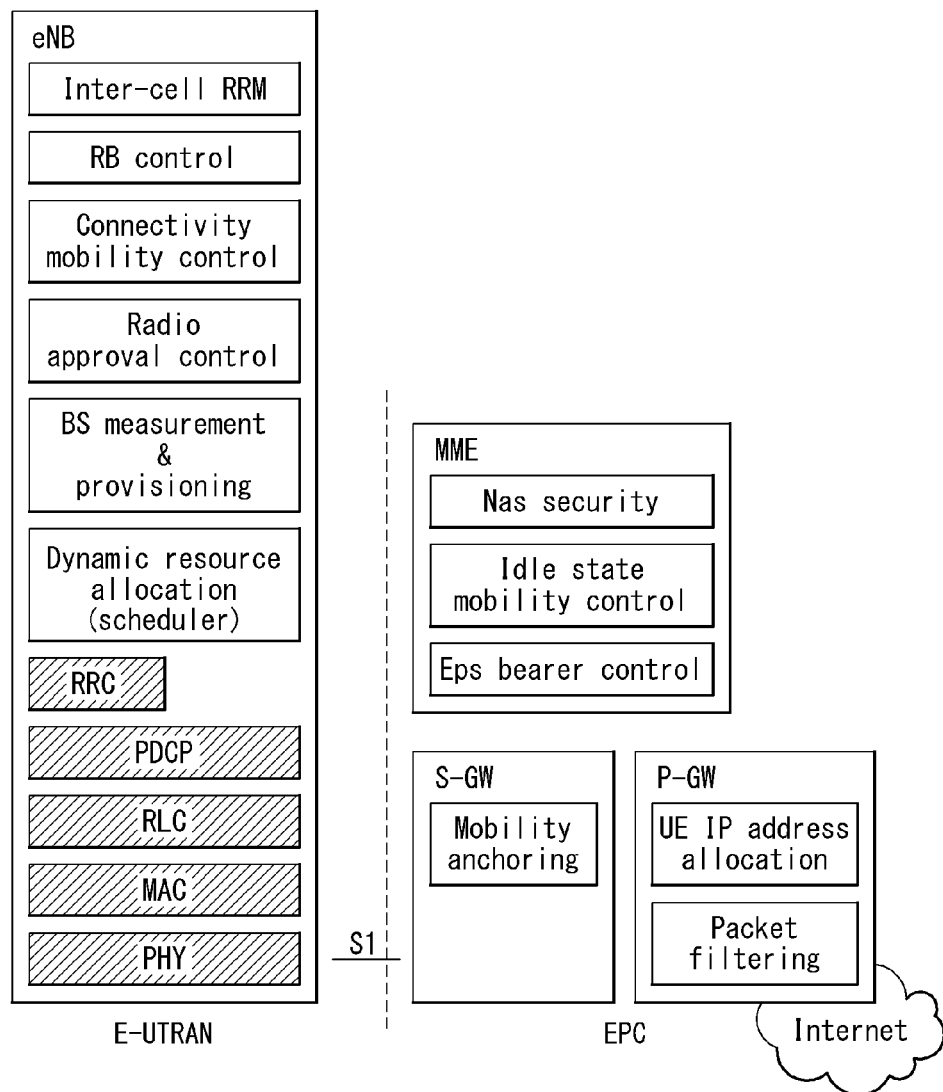

[FIG. 4]
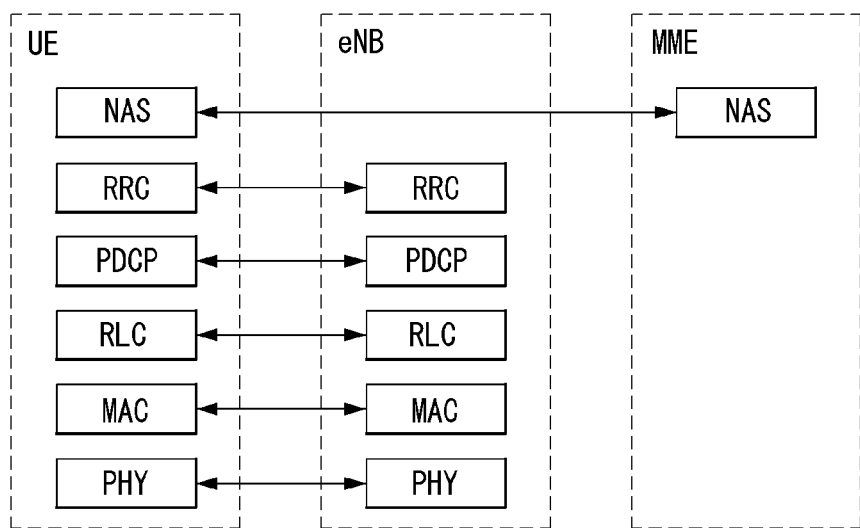
(a) Control plane protocol stack
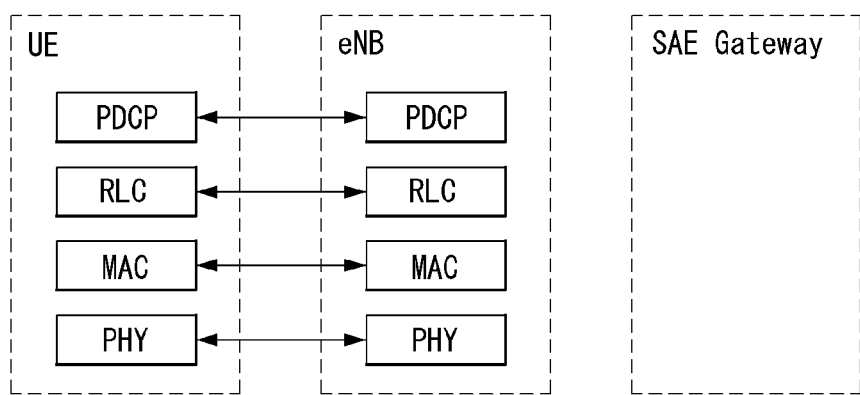
(b) User plane protocol stack

[FIG. 5]
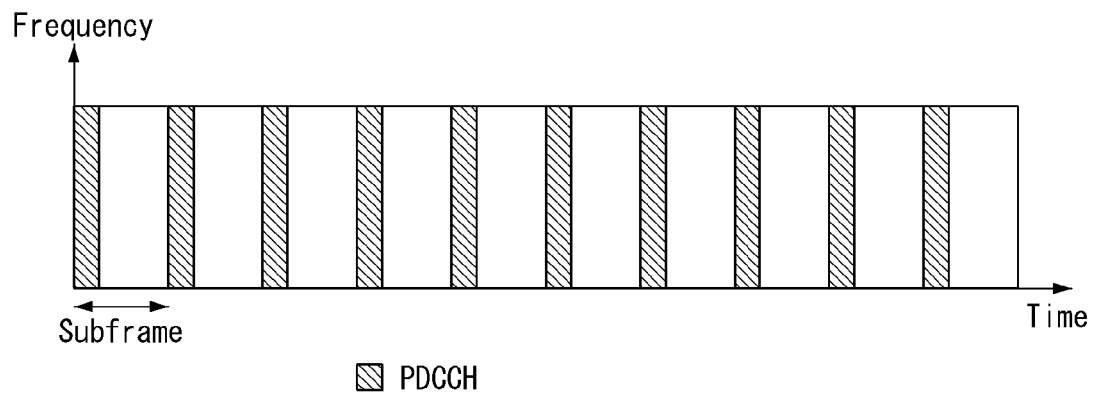
[FIG. 6]
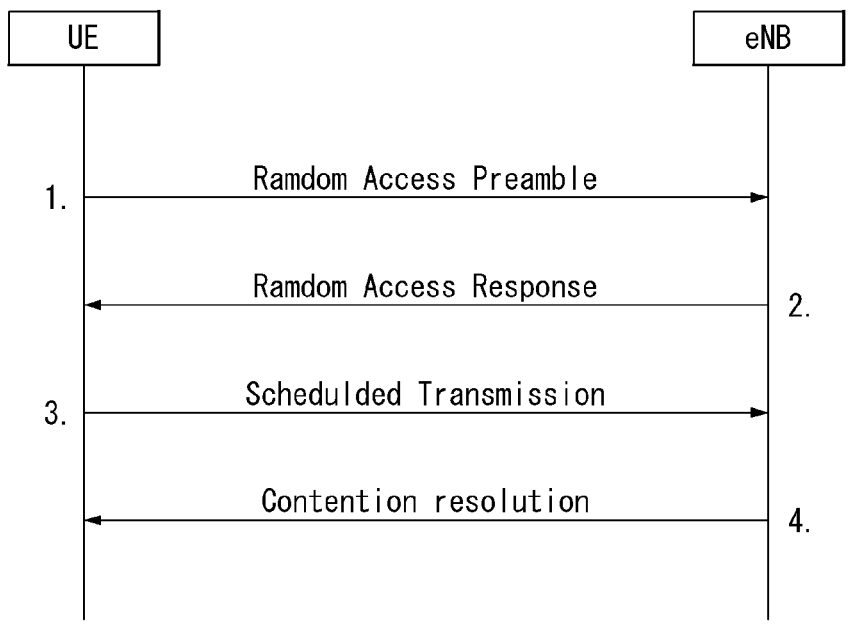

[FIG. 7]
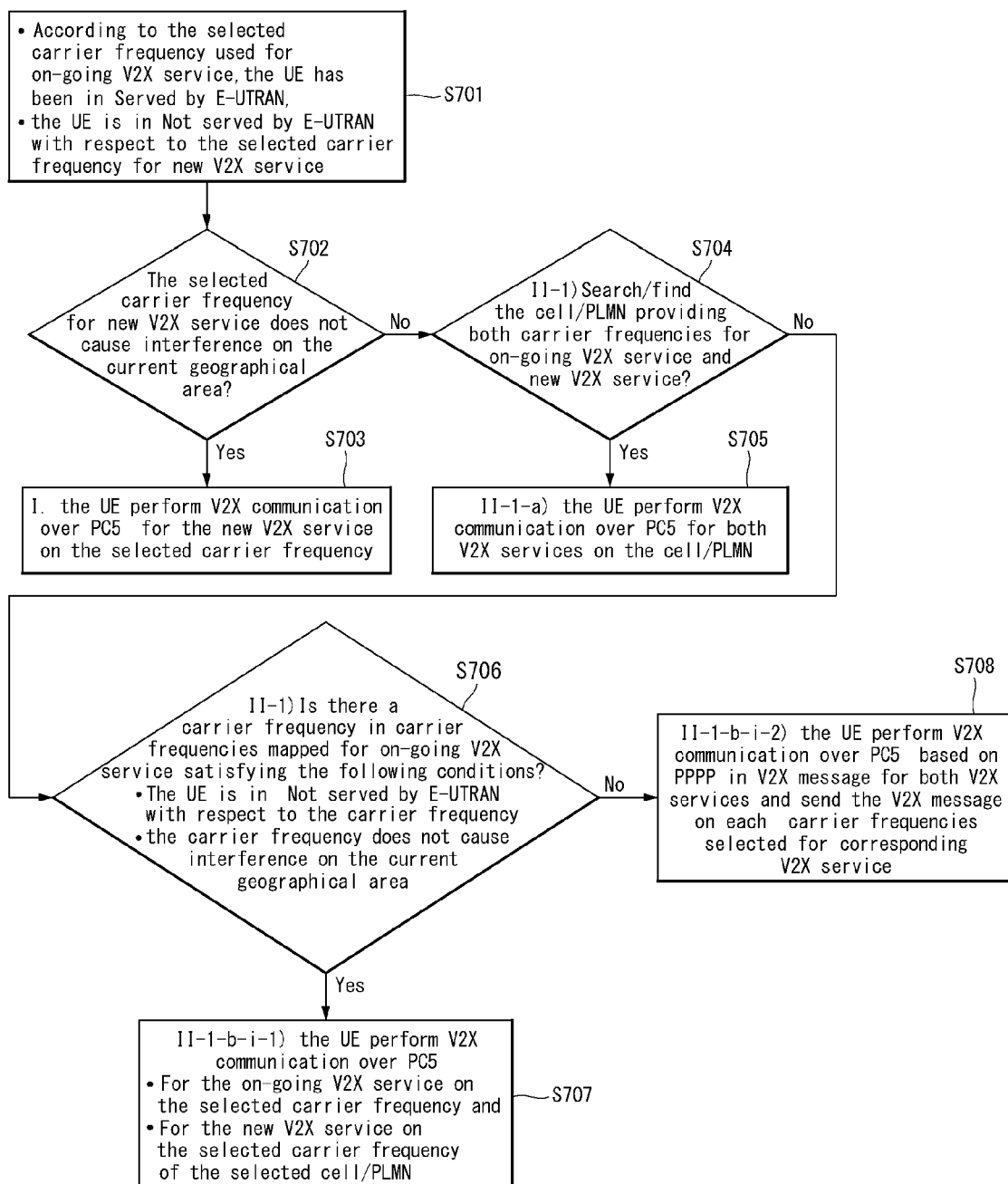

[FIG. 8]
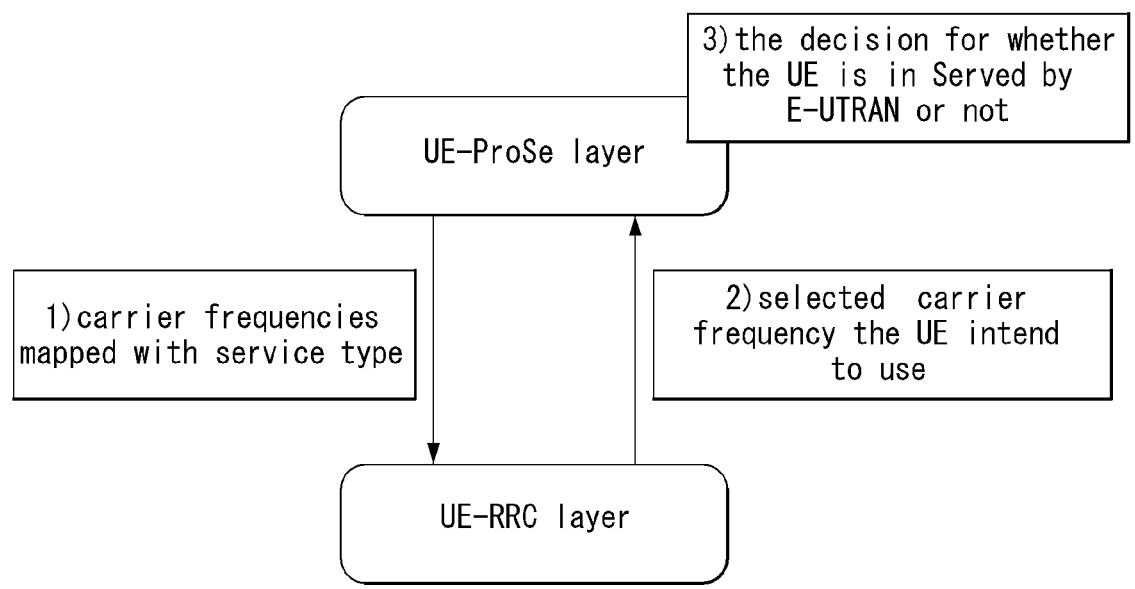

[FIG. 9]
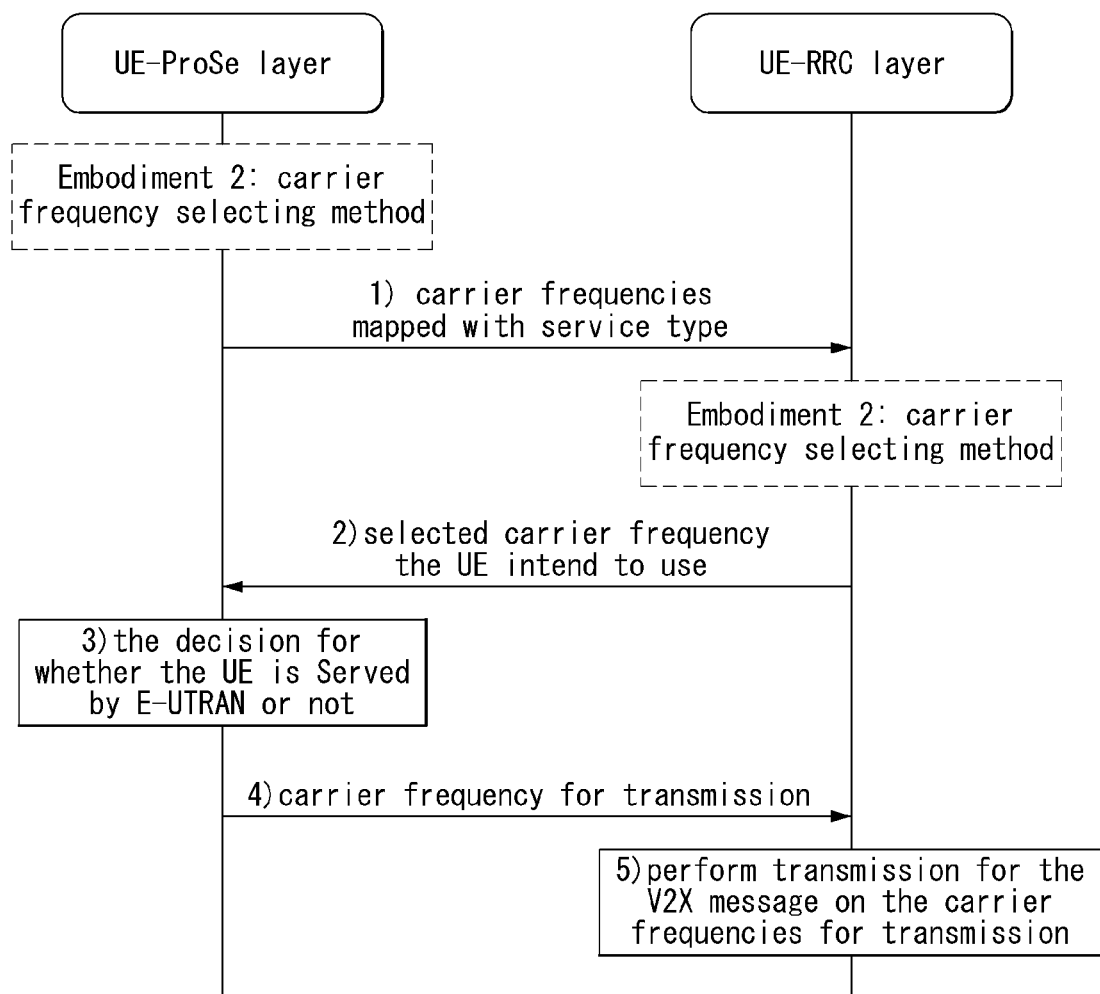

[FIG. 10]
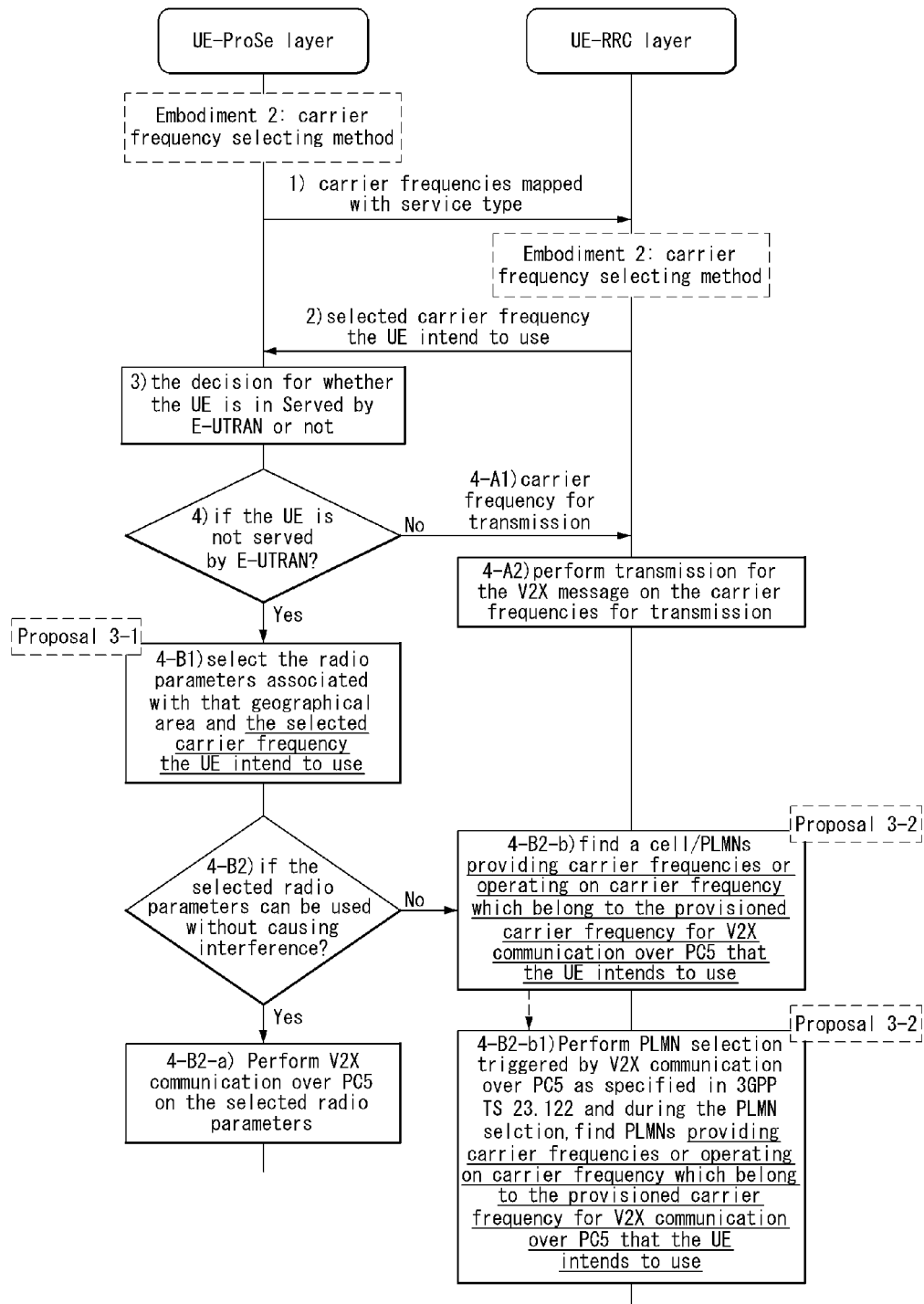

[FIG. 11]
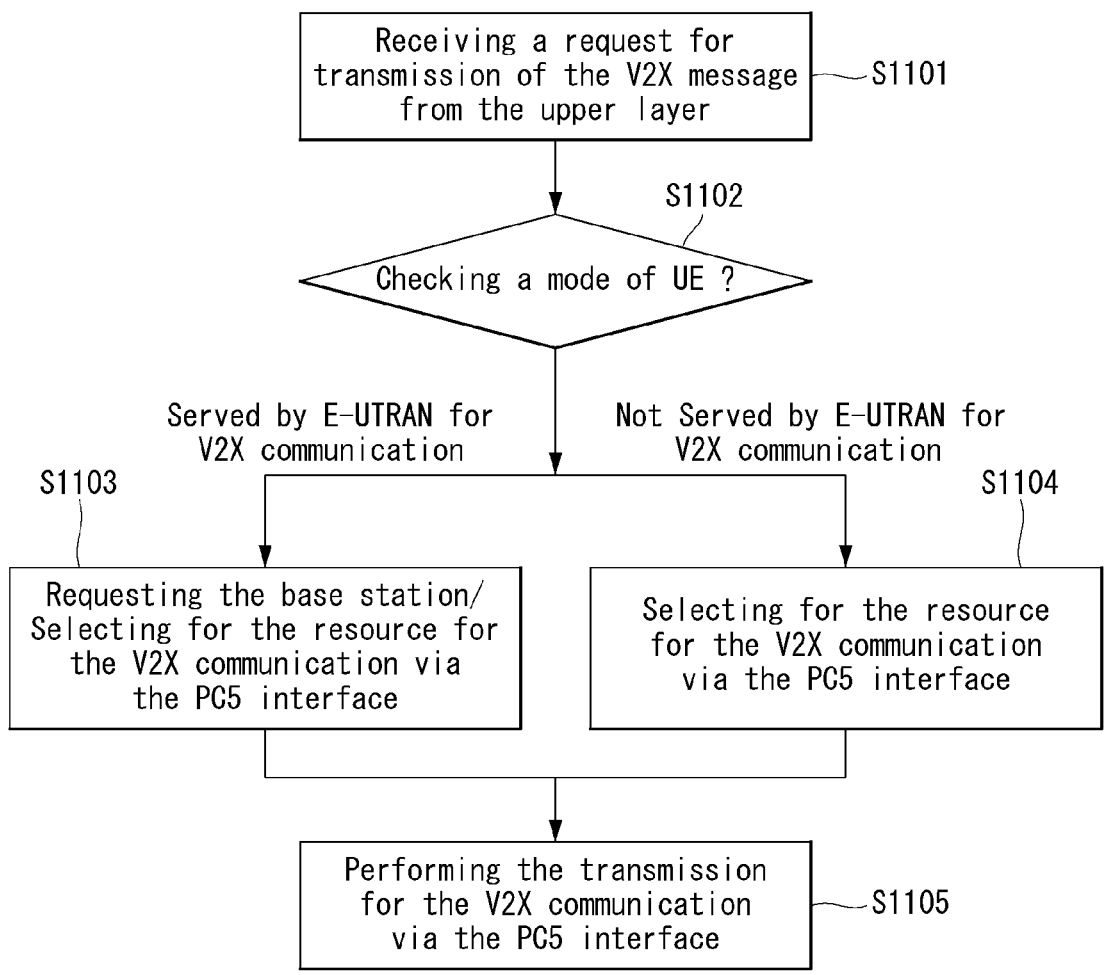

[FIG. 12]
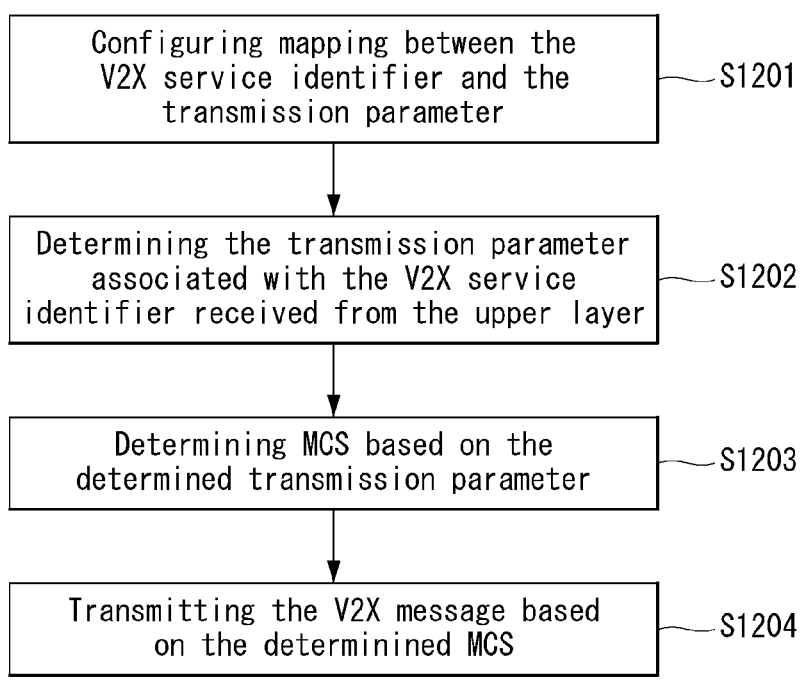
[FIG. 13]
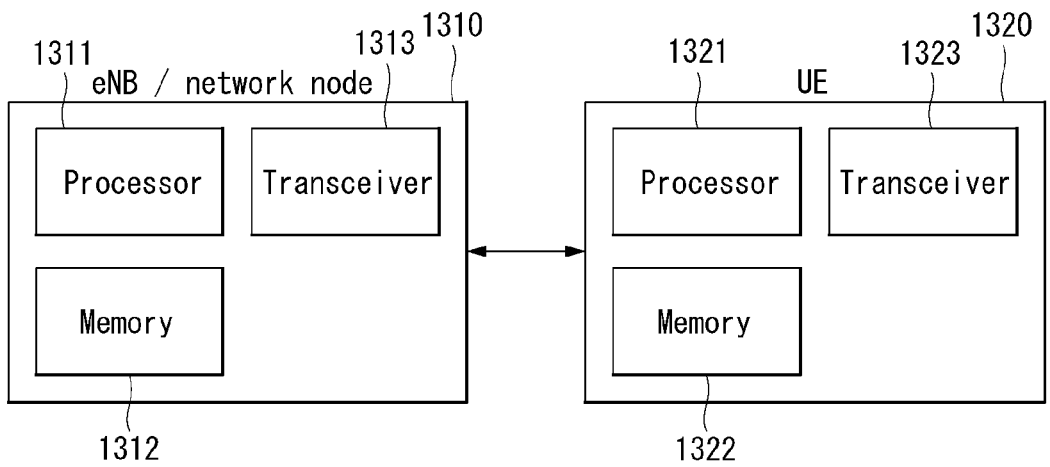

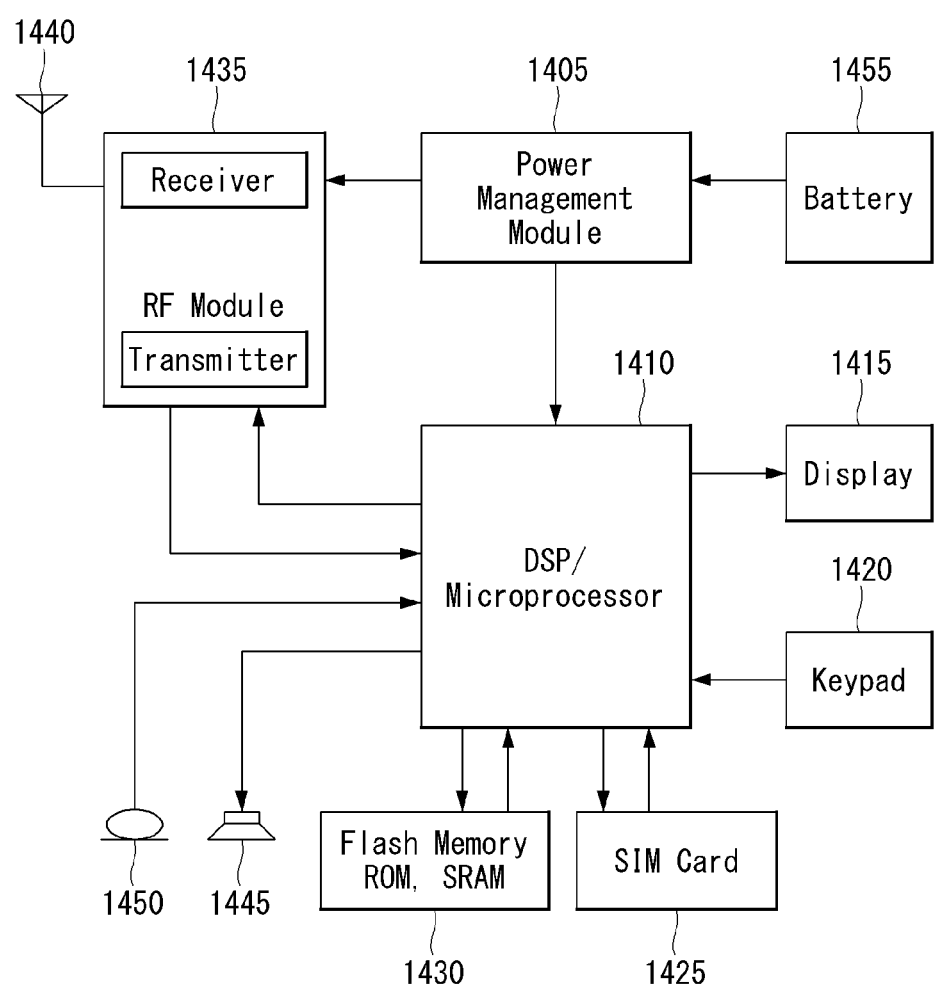
[FIG. 14]

METHOD FOR PERFORMING V2X COMMUNICATION IN WIRELESS COMMUNICATION SYSTEM AND APPARATUS FOR SAME

CROSS-REFERENCE TO RELATED APPLICATIONS

This application is a continuation of U.S. patent application Ser. No. 16/132,299, filed on Sep. 14, 2018, now U.S. Pat. No. 10,542,399, which claims the benefit of U.S. Provisional Application No. 62/558,393, filed on Sep. 14, 2017, 62/563,657, filed on Sep. 27, 2017, and 62/567,242, filed on Oct. 3, 2017, the contents of which are all hereby incorporated by reference herein in their entirety.

BACKGROUND OF THE INVENTION

Field of the Invention

The present invention relates to a wireless communication system, and more particularly, to a method for performing/supporting vehicle-to-everything (V2X) communication and an apparatus for the same.

Related Art

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY OF THE INVENTION

The present invention provides a method for performing V2X communication through a PC5 (a UE (or vehicle)-to-UE (or vehicle)) radio interface/reference point) by a UE.

The present invention also provides a method for performing V2X communication by selecting an appropriate cell (or carrier frequency) by the UE when supporting a cross-carrier scheduling operation for the V2X communication through the PC5.

The present invention also provides a method for determining a transmission parameter for transmitting a V2X message (packet) for each service.

It will be appreciated by persons skilled in the art that the objects that could be achieved with the present invention are not limited to what has been particularly described hereinabove and the above and other objects that the present invention could achieve will be more clearly understood from the following detailed description.

In an aspect, a method for performing vehicle-to-everything (V2X) communication by a user equipment (UE) in a wireless communication system includes: receiving a transmission request of a V2X message of a V2X service identified by a V2X service identifier from an upper layer by using V2X communication through a PC5 interface, the transmission request including the V2X message and the V2X service identifier; requesting or selecting a resource for the V2X communication through the PC5 interface to a base station based on whether the UE is serviced by an evolved universal terrestrial radio access network (E-UTRAN) for the V2X communication; and transmitting the V2X message through the PC5 interface by transferring the V2X message to a lower layer, in which when mapping between the V2X service identifier and a transmission parameter is configured, the transmission parameter associated with the V2X service identifier may be transferred to the lower layer together with the V2X message.

In another aspect, a user equipment (UE) for performing vehicle-to-everything (V2X) communication in a wireless communication system includes: a transceiver transceiving a radio signal; and a processor for controlling the transceiver, in which the processor may be configured to receive a transmission request of a V2X message of a V2X service identified by a V2X service identifier from an upper layer by using V2X communication through a PC5 interface, in which the transmission request including the V2X message and the V2X service identifier, request or select a resource for the V2X communication through the PC5 interface to a base station based on whether the UE is serviced by an evolved universal terrestrial radio access network (E-UTRAN) for the V2X communication, and perform transmission of the V2X communication through the PC5 interface by transferring the V2X message to a lower layer, and when mapping between the V2X service identifier and a transmission parameter is configured in the UE, the transmission parameter associated with the V2X service identifier may be transferred to the lower layer together with the V2X message.

Preferably, the transmission parameter may include information informing whether to apply a modulation and coding scheme (MCS) level of 64 QAM.

Preferably, a MCS level may be determined based on the transmission parameter associated with the V2X service identifier by the lower layer.

Preferably, the determined MCS level applied to the V2X message may be included in sidelink control information (SCI) and transmitted to the receiving UE.

Preferably, the transmission request may further include carrier frequency information mapped with the V2X service identifier.

Preferably, the method may further include: selecting a carrier frequency which the UE intends to use; and transferring the selected carrier frequency information to the upper layer.

Preferably, the method may further include receiving the carrier frequency information for transmission from the upper layer, in which the V2X message may be transmitted on the carrier frequency for the transmission.

Preferably, the carrier frequency information mapped with the V2X service identifier may include information informing whether the carrier frequency information needs to be particularly used for each carrier frequency.

According to an embodiment of the present invention, a UE can effectively perform V2X communication.

Further, according to an embodiment of the present invention, when a cross-carrier scheduling operation is supported for the V2X communication through a PC5, the UE can effectively perform the V2X communication.

In addition, according to an embodiment of the present invention, as a transmission parameter is determined differently for each service type, a reception target (all UEs or a specific UE) of the corresponding V2X message (packet) can be adjusted according to a service.

It will be appreciated by persons skilled in the art that the effects that can be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention can be applied.

FIG. 2 illustrates an example of evolved universal terrestrial radio access network structure to which the present invention can be applied.

FIG. 3 exemplifies a structure of E-UTRAN and EPC in a wireless communication system to which the present invention can be applied.

FIG. 4 illustrates a structure of a radio interface protocol between a UE and E-UTRAN in a wireless communication system to which the present invention can be applied.

FIG. 5 is a diagram schematically showing a structure of a physical channel in a wireless communication system to which the present invention may be applied.

FIG. 6 is a diagram for describing a contention based random access procedure in a wireless communication system to which the present invention may be applied.

FIG. 7 is a diagram exemplifying a carrier frequency selecting method for V2X communication through a PC5 according to an embodiment of the present invention.

FIG. 8 is a diagram exemplifying a carrier frequency selecting method for V2X communication through a PC5 according to an embodiment of the present invention.

FIG. 9 exemplifies an operation of a UE related with carrier frequency selection and V2X message transmission according to an embodiment of the present invention.

FIG. 10 exemplifies a method for carrier frequency selection and cell/PLMN selection according to an embodiment of the present invention.

FIG. 11 exemplifies a method for performing V2X communication according to an embodiment of the present invention.

FIG. 12 exemplifies a method for performing V2X communication according to an embodiment of the present invention.

FIG. 13 illustrates a block configuration diagram of a communication apparatus according to an embodiment of the present invention.

FIG. 14 exemplifies a block diagram of a communication apparatus according to an embodiment of the present invention.

DESCRIPTION OF EXEMPLARY EMBODIMENTS

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

Public Land Mobile Network (PLMN): a network formed to provide mobile communication services to individuals. The PLMN can be formed separately for each operator.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LIE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Hereinafter, terms used in this specification will be described below.

Dedicated bearer: An EPS bearer associated with an uplink packet filter(s) in the UE and a downlink packet filter(s) in a P-GW. Here, only a specific packet matches a filter(s).

Default bearer: An EPS bearer established as every new PDN connection. A context of the default bearer is maintained during a lifetime of the PDN connection.

EPS Mobility Management (EMM)-NULL state: An EPS service in the UE is deactivated. No EPS mobility management function is also performed.

EMM-DEREGISTERED state: In an EMM-DEREGISTERED state, an EMM context is not established and a UE location is not notified to the MME. Therefore, the UE is unreachable by the MME. In order to establish the EMM context, the UE needs to start an attach procedure or combined attach procedure.

EMM-REGISTERED state: In an EMM-REGSTERED state, the EMM context in the UE is established and a default EPS bearer context is activated. When the UE is in an EMM-IDLE mode, the UE location is notified to the MME with accuracy of a list of TAs including a specific number of a TA. The UE may start transmission and reception of user data and signaling information. Further, a TAU procedure or a combined TAU procedure is performed.

EMM-CONNECTED mode: When an NAS signaling connection is established between the UE and the network, the UE is in the EMM-CONNECTED mode. A term of EMM-CONNECTED may be referred to as a term of the EMM-CONNECTED state.

EMM-IDLE mode: When the NAS signaling connection does not exist between the UE and the network (that is, an EMM-IDLE mode without a suspend indication) or RRC connection suspend is indicated by a lower layer (that is, an EMM-IDLE mode accompanying the suspend indication, the UE is in the EMM-IDLE mode. A term of EMM-IDLE may be referred to as a term of the EMM-IDLE state.

EMM context: When the attach procedure is successfully completed, the EMM context is established in the UE and the MME.

Control plane CIoT EPS optimization: Signaling optimization to enable efficient transport of user data (IP, non-IP or SMS) through a control plane via the MME. The control plane CIoT EPS optimization may selectively include header compression of IP data.

User Plane CIoT EPS optimization: Signaling optimization to enable efficient transport of user data (IP or non-IP) through a user plane EPS service(s): a service(s) provided by a PS domain.

NAS signaling connection: Peer-to-peer S1 mode connection between the UE and the MME. The NAS signaling connection is configured by concatenation of an RRC connection via an LTE-Uu interface and an S1AP connection via an S1 interface.

UE using EPS services with control plane CIoT EPS optimization with control plane CIoT EPS optimization: UE attached for EPS service with control plane CIoT EPS optimization accepted by the network Non-Access Stratum (NAS): Functional layer for UMTS, signaling between the UE and a core network in an EPS protocol stack, and transmitting and receiving a traffic message. The NAS has a main function to support the mobility of the UE and support a session management procedure of establishing and maintaining an IP connection between the UE and the PDN GW.

Access Stratum (AS): means a protocol layer below the NAS layer on an interface protocol between E-UTRAN (eNB) and the UE or between E-UTRAN (eNB) and the MME. For example, in a control plane protocol stack, an RRC layer, a PDCP layer, an RLC layer, an MAC layer, and a PHY layer may be collectively referred to as an AS layer or any one layer of the layers may be referred to as the AS layer. Alternatively, in a user plane protocol stack, the PDCP layer, the RLC layer, the MAC layer, and the PHY layer may be collectively referred to as the AS layer or any one layer of the layers may be referred to as the AS layer.

S1 mode: means a mode applied to a system having functional separation depending on use of the S1 interface between a radio access network and the core network. The S1 mode includes a WB-S1 mode and an NB-S1 mode.

NB-S1 mode: When a serving radio access network of the UE provides an access to a network service (via E-UTRA) by narrow band (NB)-Internet of things (IoT), this mode is applied to the UE.

WB-S1 mode: The system operates in the S1 mode, but when the corresponding mode is not the NB-S1 mode, this mode is applied.

Mapping Between Service Types and V2X Frequencies

In 3GPP, in association with addition of a configuration parameter for supporting mapping between service types and V2X frequencies, contributions are approved. This will be described.

5.2.4 Configuration Parameters for V2X Communication Over PC5

The configuration parameters for V2X communication over PC5 consist of:

a) an expiration time for the validity of the configuration parameters for V2X communication over PC5;

b) a list of PLMNs in which the UE is authorized to use V2X communication over PC5 when the UE is served by E-UTRAN;

c) an indication of whether the UE is authorized to use V2X communication over PC5 when the UE is not served by E-UTRAN;

d) per geographical area:

1) radio parameters for V2X communication over PC5 applicable when the UE is not served by E-UTRAN and is located in the geographical area, with an indication of whether these radio parameters are "operator managed" or "non-operator managed". The allowed "non-operator managed" radio parameters for V2X communication are defined in 3GPP TS 36.101;

e) a list of the V2X services authorized for V2X communication over PC5. Each entry of the list contains:

1) a V2X service identifier; and 2) a destination Layer-2 ID;

f) PPPP to PDB mapping rules between the ProSe Per-Packet Priority (PPPP) and the Packet Delay Budget (PDB) for V2X communication over PC5;

g) optionally, a default destination Layer-2 ID;

h) optionally, a configuration for the applicability of privacy for V2X communication over PC5, containing:

1) a T5000 timer indicating how often the UE shall change the source Layer-2 ID and source IP address (for IP data) self-assigned by the UE for V2X communication over PC5; and 2) a list of the V2X services which require privacy for V2X communication over PC5. Each entry in the list contains:

A) a V2X service identifier; and

B) optionally, one or more associated geographical areas; and i) optionally, V2X service identifier to V2X frequency mapping rules between the V2X service identifiers and the V2X frequencies with associated geographical areas for V2X communication over PC5

6.1.2.1 Initiation

The upper layers can request the UE to send a V2X message of a V2X service identified by a V2X service identifier using V2X communication over PC5. The request from the upper layers includes:

a) the V2X message;

b) the V2X service identifier of the V2X service for the V2X message;

c) the type of data in the V2X message (IP or non-IP);

d) if the V2X message contains non-IP data, the V2X message family of data in the V2X message; and e) the V2X message priority.

Upon a request from upper layers to send a V2X message of a V2X service identified by a V2X service identifier using V2X communication over PC5, the UE shall proceed as follows:

a) if the following conditions are met:

1) the UE is served by E-UTRAN;

2) the UE intends to use the radio resources (i.e. carrier frequency) provided by an E-UTRAN cell;

3) the registered PLMN is in the list of PLMNs in which the UE is authorized to use V2X communication over PC5 when the UE is served by E-UTRAN as specified in subclause 5.2.4; and 4) the V2X service identifier of the V2X service is included in the list of V2X services authorized for V2X communication over PC5 as specified in subclause 5.2.4 or the UE is configured with a default destination Layer-2 ID for V2X communication over PC5 as specified in subclause 5.2.4;

then the UE shall:

1) if the UE is configured with V2X service identifier to V2X frequency mapping rules for V2X communication over PC5 as specified in subclause 5.2.4 and there is one or more V2X frequencies associated with the V2X service identifier of the V2X service for the V2X message in the current the geographical area, pass the one or more V2X frequencies associated with the V2X service identifier of the V2X service for the V2X message to the lower layers;

2) request radio resources for V2X communication over PC5 as specified in 3GPP TS 24.334 subclause 10.2.2; and 3) perform transmission of V2X communication over PC5 as specified in subclause 6.1.2.2; and b) if the following conditions are met:

1) the UE is:

A) not served by E-UTRAN;

B) in limited service state as specified in 3GPP TS 23.122, if the reason for the UE being in limited service state is one of the following;

i) the UE is unable to find a suitable cell in the selected PLMN as specified in 3GPP TS 36.304;

ii) the UE received an ATTACH REJECT message or a TRACKING AREA UPDATE REJECT message or a SERVICE REJECT message with the EMM cause #11 "PLMN not allowed" as specified in 3GPP TS 24.301 or a LOCATION UPDATING REJECT message or a GPRS ATTACH REJECT message or a ROUTING AREA UPDATE REJECT message or SERVICE REJECT message with the EMM cause #11 "PLMN not allowed" as specified in 3GPP TS 24.008; or iii) the UE received an ATTACH REJECT message or a TRACKING AREA UPDATE REJECT message or a SERVICE REJECT message with the EMM cause #7 "EPS services not allowed" as specified in 3GPP TS 24.301 or a LOCATION UPDATING REJECT message or a GPRS ATTACH REJECT message or a ROUTING AREA UPDATE REJECT message or a SERVICE REJECT message with the EMM cause #7 "GPRS services not allowed" as specified in 3GPP TS 24.008; or C) in limited service state as specified in 3GPP TS 23.122 for reasons other than i), ii) or iii) above, and located in a geographical area for which the UE is provisioned with "non-operator managed" radio parameters as specified in subclause 5.2.4;

2) the UE is authorized to use V2X communication over PC5 when the UE is not served by E-UTRAN as specified in subclause 5.2.4; and 3) the V2X service identifier of the V2X service is included in the list of V2X services authorized for V2X communication over PC5 as specified in subclause 5.2.4 or the UE is configured with a default destination Layer-2 ID for V2X communication over PC5 as specified in subclause 5.2.4;

then the UE shall:

1) if the UE is configured with V2X service identifier to V2X frequency mapping rules for V2X communication over PC5 as specified in subclause 5.2.4 and there is one or more V2X frequencies associated with the V2X service identifier of the V2X service for the V2X message in the current the geographical area, pass the one or more V2X frequencies associated with the V2X service identifier of the V2X service for the V2X message to the lower layers;

2) select radio resources for V2X communication over PC5 as specified in subclause 6.1.2.3; and 3) perform transmission of V2X communication over PC5 as specified in subclause 6.1.2.2;
    else the UE shall not perform transmission of V2X communication over PC5.

Meanwhile, in order to support a cross-carrier operation for the V2X communication in the 3GPP, a contribution to add a 'not served by E-UTRAN' mode for the V2X communication and add an exceptional UE operation is approved. A major change among them is described below.

According to the change to be described below, it is determined whether the UE is 'served by E-UTRAN' or 'not served by E-UTRAN' according to a carrier frequency provided or operated by the network (e.g., eNB or cell). According to the determination of whether the UE is 'served by E-UTRAN' or 'not served by E-UTRAN', the UE performs a procedure for acquiring a radio resource by each selection.

The UE is defined as "Not served by E-UTRAN" mode for the V2X communication when the UE:
    deviates from E-UTRAN;
    is within the E-UTRAN coverage, but does not camp on any cell;
    is within the E-UTRAN coverage, but does not camp on a non-E-UTRAN cell;
    camps on the E-UTRAN cell which does not indicate that the V2X communication through the PC5 is supported by the network; or
    camps on an E-UTRAN cell indicating that the V2X communication through the PC5 is supported by the network and providing the carrier frequency and/or radio resource for the V2X communication through the PC5 which does not belong to a provisioned carrier frequency which the UE intends to use.

V2X service identifier: Identifier (for example, a provider service identifier (PSID) for V2X application or an intelligent transport system (ITS) application identifier (ITS-AID)) for the V2X service The upper layers can request the UE to send a V2X message of a V2X service identified by a V2X service identifier using V2X communication over PC5. The request from the upper layers includes:
    a) the V2X message;
    b) the V2X service identifier of the V2X service for the V2X message;
    c) the type of data in the V2X message (IP or non-IP);
    d) if the V2X message contains non-IP data, the V2X message family of data in the V2X message; and
    e) the V2X message priority.

Upon a request from upper layers to send a V2X message of a V2X service identified by a V2X service identifier using V2X communication over PC5, the UE shall proceed as follows:
    a) if the following conditions are met:
    1) the UE is served by E-UTRAN for V2X communication;
    2) the UE intends to use the radio resources (i.e. carrier frequency) provided by an E-UTRAN cell;
    3) the registered PLMN is in the list of PLMNs in which the UE is authorized to use V2X communication over PC5 when the UE is served by E-UTRAN for V2X communication as specified in subclause 5.2.4; and
    4) the V2X service identifier of the V2X service is included in the list of V2X services authorized for V2X communication over PC5 as specified in subclause 5.2.4 or the UE is configured with a default destination Layer-2 ID for V2X communication over PC5 as specified in subclause 5.2.4;
    then the UE shall:
    1) request radio resources for V2X communication over PC5 as specified in 3GPP TS 24.334 subclause 10.2.2; and
    2) perform transmission of V2X communication over PC5 as specified in subclause 6.1.2.2; and
    b) if the following conditions are met:
    1) the UE is:
    A) not served by E-UTRAN for V2X communication;
    B) in limited service state as specified in 3GPP TS 23.122, if the reason for the UE being in limited service state is one of the following;
    i) the UE is unable to find a suitable cell in the selected PLMN as specified in 3GPP TS 36.304;
    ii) the UE received an ATTACH REJECT message or a TRACKING AREA UPDATE REJECT message or a SERVICE REJECT message with the EMM cause #11 "PLMN not allowed" as specified in 3GPP TS 24.301 or a LOCATION UPDATING REJECT message or a GPRS ATTACH REJECT message or a ROUTING AREA UPDATE REJECT message or SERVICE REJECT message with the EMM cause #11 "PLMN not allowed" as specified in 3GPP TS 24.008; or
    iii) the UE received an ATTACH REJECT message or a TRACKING AREA UPDATE REJECT message or a SERVICE REJECT message with the EMM cause #7 "EPS services not allowed" as specified in 3GPP TS 24.301 or a LOCATION UPDATING REJECT message or a GPRS ATTACH REJECT message or a ROUTING AREA UPDATE REJECT message or a SERVICE REJECT message with the EMM cause #7 "GPRS services not allowed" as specified in 3GPP TS 24.008; or
    C) in limited service state as specified in 3GPP TS 23.122 for reasons other than i), ii) or iii) above, and located in a geographical area for which the UE is provisioned with "non-operator managed" radio parameters as specified in subclause 5.2.4;
    2) the UE is authorized to use V2X communication over PC5 when the UE is not served by E-UTRAN for V2X communication as specified in subclause 5.2.4; and
    3) the V2X service identifier of the V2X service is included in the list of V2X services authorized for V2X communication over PC5 as specified in subclause 5.2.4 or the UE is configured with a default destination Layer-2 ID for V2X communication over PC5 as specified in subclause 5.2.4;
    then the UE shall:
    1) select radio resources for V2X communication over PC5 as specified in subclause 6.1.2.3; and
    2) perform transmission of V2X communication over PC5 as specified in subclause 6.1.2.2;
    else the UE shall not perform transmission of V2X communication over PC5.

If the UE is camped on an E-UTRAN cell indicating that V2X communication over PC5 is supported by the network, but not broadcasting any carrier frequencies and radio resources for V2X communication over PC5 as specified in 3GPP TS 36.331, the UE shall request radio resources for V2X communication over PC5 as specified in 3GPP TS 24.334 subclause 10.2.2.

Procedure to Request Radio Resources for V2X Communication Over PC5 when the UE is Served by E-UTRAN Hereinafter, a scheme that requests the radio resource when the UE is served by E-UTRAN will be described.

10.2.2 ProSe Direct Communication Facilitated by Serving E-UTRAN

When the UE is served by E-UTRAN and intends to use the ProSe radio resources (i.e. carrier frequency) provided by an E-UTRAN cell, the UE requests the parameters from the lower layers for transmitting or receiving ProSe direct communication (see 3GPP TS 36.331). The UE shall perform direct communication only if the lower layers indicate that ProSe direct communication is supported by the network. If the UE in EMM-IDLE mode has to request resources for ProSe direct communication as specified in 3GPP TS 36.331, the UE shall perform a service request procedure or tracking area update procedure as specified in 3GPP TS 24.301. Once the radio resources for transmitting or receiving ProSe direct communication are provided by eNodeB as specified in 3GPP TS 36.331, the UE shall start ProSe direct communication.

When UE is in a Mode of 'not Served by E-UTRAN', Procedure of Requesting Radio Resource for V2X Communication Through PC5

When the UE is not served by E-UTRAN for V2X communication, the UE shall select the radio parameters to be used for V2X communication over PC5 as follows:
  if the UE can determine itself located in a geographical area, and the UE is provisioned with radio parameters for the geographical area, the UE shall select the radio parameters associated with that geographical area; or
  in all other cases, the UE shall not initiate V2X communication over PC5.

When the UE is in coverage of a 3GPP RAT it can for example use information derived from the serving PLMN. When the UE is not in coverage of a 3GPP RAT it can use other techniques, e.g. Global Navigation Satellite System (GNSS). The UE shall not consider user provided location as a valid input to locate itself in a specific geographical area.

If the UE intends to use "operator managed" radio parameters before initiating V2X communication over PC5, the UE shall check with lower layers whether the selected radio parameters can be used in the current location without causing interference to other cells, and:
  if the lower layers indicate that the usage would not cause any interference, the UE shall initiate V2X communication over PC5; or
  else if the lower layers report that one or more PLMNs operate in the provisioned radio resources (i.e. carrier frequency) then:
    a) if the following conditions are met:
    1) none of the PLMNs reported by the lower layers is the registered PLMN or equivalent to the registered PLMN;
    2) at least one of the PLMNs reported by the lower layers is in the list of authorized PLMNs for V2X communication over PC5 and provides radio resources for V2X communication over PC5; and
    3) the UE does not have an emergency PDN connection; then the UE shall:
    1) if in EMM-IDLE mode, perform PLMN selection triggered by V2X communication over PC5; or
    2) else if in EMM-CONNECTED mode, either:
    i) perform a detach procedure and then perform PLMN selection triggered by V2X communication over PC5; or
    ii) not initiate V2X communication over PC5.
    Whether the UE performs i) or ii) above is left up to UE implementation
    b) else the UE shall not initiate V2X communication over PC5.

If the registration to the selected PLMN is successful, the UE shall proceed with the procedure to initiate V2X communication over PC5.

If the UE is performing V2X communication over PC5 using radio parameters associated with a geographical area and moves out of that geographical area, the UE shall stop performing V2X communication over PC5 and then:
  if the UE is not served by E-UTRAN for V2X communication or the UE intends to use radio resources for V2X communication over PC5 other than those operated by the serving E-UTRAN cell, the UE shall select appropriate radio parameters for the new geographical area as specified above; or
  if the UE is served by E-UTRAN for V2X communication and intends to use radio resources for V2X communication over PC5 operated by the serving E-UTRAN cell, the UE shall proceed with the procedure to initiate V2X communication over PC5 when served by E-UTRAN for V2X communication.

PLMN Selection Triggered by V2X Communication Over PC5

3.1C PLMN Selection Triggered by V2X Communication Over PC5

If the MS supports V2X communication over PC5 and needs to perform PLMN selection for V2X communication over PC5, then the MS shall proceed as follows:
  i) the MS shall store a duplicate value of the RPLMN and a duplicate of the PLMN selection mode that were in use before PLMN selection due to V2X communication over PC5 was initiated, unless this PLMN selection due to V2X communication over PC5 follows another PLMN selection due to V2X communication over PC5 or a manual CSG selection;
  ii) the MS shall enter into Automatic mode of PLMN selection taking into account the additional requirements in items iii) to x) below;
  iii) Among the PLMNs advertised by the E-UTRA cell operating in the radio resources provisioned to the MS for V2X communication over PC5, the MS shall choose one allowable PLMN which:
    1) provides radio resources for V2X communication over PC5;
    2) is in the list of authorised PLMNs for V2X communication over PC5; and
    3) is not in the list of "PLMNs with E-UTRAN not allowed";
    if conditions 1) through 3) above are met then the MS shall attempt to register on that PLMN. If none of the PLMNs meet conditions 1) through 3) above, the MS shall return to the stored duplicate PLMN selection mode and use the stored duplicate value of RPLMN for further action;
  iv) if the registration fails due to "PLMN not allowed" or "EPS services not allowed", then the MS shall update the appropriate list of forbidden PLMNs, and shall either:
    A) if the PLMN provides common radio resources needed by the MS to do V2X communication over PC5, perform V2X communication over PC5 on the selected PLMN in limited service state. In this case the MS shall not search for available and allowable PLMNs during the duration of V2X communication over PC5;
    B) return to the stored duplicate PLMN selection mode and use the stored duplicate value of RPLMN for further action; or
    C) perform the action described in iii) again with the choice of PLMNs further excluding the PLMNs on which the MS has failed to register.

Whether the MS performs A), B) or C) above is left up to MS implementation.

v) if the registration fails due to causes other than "PLMN not allowed" or "EPS services not allowed", the MS shall:
if the handling of the failure requires updating a list of forbidden PLMNs, update the appropriate list; and
if the handling of the failure does not require updating a list of forbidden PLMNs, remember the PLMN as a PLMN on which the MS has failed to register;
and the MS shall either:
A1) return to the stored duplicate PLMN selection mode and use the stored duplicate value of RPLMN for further action;
B1) perform the action described in iii) again with the choice of PLMNs further excluding the PLMNs on which the MS has failed to register; or
C1) perform V2X communication over PC5 in limited service state on a PLMN advertised by the cell operating in the radio resources provisioned to the MS for V2X communication over PC5, if registration on this PLMN has previously failed due to "PLMN not allowed" or "EPS services not allowed" and if this PLMN provides common radio resources needed by the MS to do V2X communication over PC5. In this case the MS shall not search for available and allowable PLMNs during the duration of V2X communication over PC5;
Whether the MS performs A1), B1) or C1) above is left up to MS implementation.

vi) if the MS is no longer in the coverage of the selected PLMN, then the MS shall either:
A2) perform V2X communication over PC5 procedures for MS to use provisioned radio resources; or
B2) return to the stored duplicate PLMN selection mode and use the stored duplicate value of RPLMN for further action.
Whether the MS performs A2) or B2) above is left up to MS implementation.

vii) if the MS is unable to find a suitable cell on the selected PLMN, then the MS shall either:
A3) if the PLMN provides common radio resources needed by the MS to do V2X communication over PC5, perform V2X communication over PC5 on the selected PLMN in limited service state. In this case the MS shall not search for available and allowable PLMNs during the duration of V2X communication over PC5; or
B3) return to the stored duplicate PLMN selection mode and use the stored duplicate value of RPLMN for further action.
Whether the MS performs A3) or B3) above is left up to MS implementation.

viii) if the MS is switched off while on the selected PLMN and switched on again, the MS shall use the stored duplicate value of RPLMN as RPLMN and behave;

ix) if the user initiates a PLMN selection while on the selected cell, the MS shall delete the stored duplicate value of PLMN selection mode, use the stored duplicate value of RPLMN as RPLMN and follow the procedures. The MS shall delete the stored duplicate value of RPLMN once the MS has successfully registered to the selected PLMN; and x) if the MS no longer needs to perform V2X communication over PC5, the MS shall return to the stored duplicate PLMN selection mode and use the stored duplicate value of RPLMN for further action.

If the PLMN selected for V2X communication over PC5 is a VPLMN, the MS shall not periodically scan for higher priority PLMNs during the duration of V2X communication over PC5.

Method for Performing V2X Communication Through PC5

According to the aforementioned contents, when the UE (i.e., the ProSe layer) receives the V2X message to be transmitted, the UE verifies the service type of the corresponding V2X message. After that, by verifying mapping a service type corresponding to a current geographical area to a V2X (carrier) frequency, the corresponding V2X frequency is transferred to the lower layer (e.g., AS layer (RRC, PDCP, and MAC layers, etc.) together the V2X message.

When a mapping rule of the V2X service identifier to V2X frequency for the V2X communication through the PC5 and when there are one or more V2X frequencies associated with the V2X service identifier of the V2X service for the V2X message in the current geographical area, the UE transfers one or more V2X frequencies associated with the V2X service identifier of the V2X service for V2X message to the lower layer.

In this case, one or more V2X frequencies may be mapped with the service type and the one or more V2X frequencies may be transferred to the lower layer.

However, with regard to the cross-carrier operation, it is determined whether the UE is 'served by E-UTRAN' or 'not served by E-UTRAN' according to the carrier frequency provided or operated by the network (e.g., eNB or cell). According to the determination of whether the UE is 'served by E-UTRAN' or 'not served by E-UTRAN', the UE performs the procedure for acquiring the radio resource by each selection.

[Problem 1]

As described above, the selected V2X carrier frequency may be different for each V2X service and 'Served by E-UTRAN' and 'Not served by E-UTRAN' may be determined according to the selected V2X carrier frequency. In this case, when the selected V2X carrier frequencies are different and V2X services with different modes ('Served by E-UTRAN' or 'Not Served by E-UTRAN') according to the selected V2X carrier frequencies simultaneously occur, the UE needs to simultaneously perform operations according to two modes ('Served by E-UTRAN' and 'Not Served by E-UTRAN').

In this case, PLMN selection triggered by the V2X communication via the PC5 may be performed when performing the operation according to the 'Not served by E-UTRAN' mode, and as a result, registration may be performed with new PLMN different from registered PLMN which performs the 'Served by E-UTRAN' operation.

Consequently, since the UE needs to register only one PLMN at a time, there is a problem that a plurality of V2X services may not be simultaneously performed.

[Problem 2]

In the related art, when the UE-ProSe layer delivers the carrier frequency to the lower layer (for example, a UE-RRC layer), the lower layer selects one or more carrier frequencies to perform transmission. In this case, the lower layer may select only one carrier frequency.

When it is necessary to simultaneously transmit the same V2X message on one or more carrier frequencies, it is impossible to implement the simultaneous transmission in the method in the related art. For example, when a carrier frequency 1 is configured in area A and a carrier frequency 2 is configured in area B for a specific service, the V2X message needs to be simultaneously transmitted at the carrier frequencies 1 and 2 in a boundary area between A and B.

However, in such a situation, there arises a problem that the same V2X message may not be transmitted simultaneously on one or more carrier frequencies.

Therefore, in the embodiment of the present invention, a method for selecting the frequency for the V2X communication through the PC5 is proposed in order to solve the above problem.

In this specification, performing, by UE, the V2X communication via the PC5 in the served by E-UTRAN mode means performing the sidelink operation (e.g., the V2X communication through the PC5) by receiving a sidelink resource (i.e., PC5) from the network (e.g., eNB).

In addition, performing, by the UE, the V2X communication through the PC5 in the Not serviced by the E-UTRAN means performing the sidelink operation (e.g., the V2X communication through the PC5) by using a predetermined radio resource (without the aid of the network).

[First Embodiment] when there is No On-Going V2X Service

The carrier frequency selecting method will be described below.

When there is the carrier frequency corresponding to 'served by E-UTRAN' among the carrier frequencies derived according to the mapping of the carrier frequency with the service type for a new V2X service which newly occurs, the UE may preferentially select the carrier frequency corresponding to 'served by E-UTRAN'.

Specifically, the above case will be described below.

When there is no current on-going V2X service:

According to the mapping of the carrier frequency with the service type for the new V2X service which newly occurs, one or more carrier frequencies may be derived, and as a result, the following cases may occur.

1. A case where all derived carrier frequencies are 'served by E-UTRAN';
2. A case where all derived carrier frequencies are 'Not served by E-UTRAN';
3. A case where some carrier frequencies among the derived carrier frequencies are 'served by E-UTRAN' and some carrier frequencies are 'Not served by E-UTRAN';

In this case, the UE operates as follows:

In cases 1) and 2) among the above cases, the UE may perform the corresponding operations. That is, in case 1), the UE may perform the 'served by E-UTRAN' operation and in case 2), the UE may perform the 'Not served by E-UTRAN' operation.

On the contrary, in case 3), the UE may preferentially select the 'served by E-UTRAN'. However, even in this case, a case where a specific carrier frequency needs to be particularly selected at the time of selecting the carrier frequency may be excluded.

[Second Embodiment] when there is On-Going V2X Service

The carrier frequency selecting method will be described below.

When there is the carrier frequency corresponding to a mode (i.e., 'served by E-UTRAN' or 'Not served by E-UTRAN') which is common in the carrier frequency derived according to the mapping of the carrier frequency with the service type for the new V2X service which newly occurs and the carrier frequency derived according to the mapping of the carrier frequency with the service type for the on-going V2X service, all V2X services may select the carrier frequency corresponding to the common mode. The following implementation method is possible.

A. The UE may select the carrier frequency corresponding to the mode in which the on-going V2X service is in progress as the carrier frequency for the new V2X service.

B. The UE may change the carrier frequency of the on-going V2X service to the carrier frequency corresponding to the mode of the selected carrier frequency of the new V2X service.

C. The carrier frequency of the new V2X service may be selected and used independently/regardless of the on-going V2X service.

In case C) above, the UE preferably operate as follows so that the UE does not perform unnecessary PLMN selection. This will be described below with reference to FIG. 7.

FIG. 7 is a diagram exemplifying a carrier frequency selecting method for V2X communication through a PC5 according to an embodiment of the present invention.

When there is the on-going V2X service that transmits the V2X message through 'served by E-UTRAN' (in the other on-going V2X service, the V2X message may be transmitted with a radio resource pre-configured as 'Not served by E-UTRAN') and the corresponding V2X service of the V2X message which newly occurs selects the carrier frequency corresponding to 'Not served by E-UTRAN' (S701), the UE (e.g., AS or RRC layer) checks whether the selected carrier frequency may be used without causing interference at a current location (S702).

I. When it is determined that a current situation is a situation which does not cause interference, the UE use the V2X communication through the selected carrier frequency (S703).

II. When the current situation is a situation which causes the interference (when a cell which operates at the corresponding carrier frequency is shown/exists), 1. The UE preferentially finds a cell (or PLMN) providing both the carrier frequency corresponding to the mapping of the carrier frequency with the V2X service type of the on-going V2X service and the carrier frequency corresponding to the mapping of the carrier frequency with the V2X service type of the new V2X service (providing the carrier frequency includes a case where the corresponding carrier frequency is included in 'InterV2XfrequencyList' or a case where the operating carrier frequency is the corresponding carrier frequency) (S704).

a) When the cell (or PLMN) providing both carrier frequencies is found, the UE performs cell reslection/handover for changing the cell to the corresponding cell (or PLMN) or PLMN reselection for the V2X communication through the PC5 according to Section 6.1.2.3 (S705).

b) When the cell (or PLMN) providing both carrier frequencies is not found and only a cell providing the carrier frequency providing the carrier frequency corresponding to the mapping of the carrier frequency with the V2X service type of the corresponding V2X service of the V2X message which newly occurs is found, i) Among the carrier frequencies corresponding to the mapping of the carrier frequency with the V2X service type of the on-going V2X service, the UE finds a carrier frequency in which the 'Not served by E-UTRAN' mode is available and the V2X communication is available without interference at the current location (S706).

1) When the corresponding carrier frequency is found, the UE performs the V2X communication through the PC5 for the on-going V2X service by selecting the corresponding carrier frequency. In addition, the UE performs cell reselection/handover for changing to the cell (or PLMN) providing the carrier frequency corresponding to the mapping of the carrier frequency with the V2X service type of the new V2X service or PLMN reselection for the V2X communication through the PC5 (S707).

2) When the corresponding carrier frequency is not found, the UE processes the V2X message having a high priority (that is, having a low PPPP value) first on the basis of PPPP (S708).

That is, when the V2X message having a lowest PPPP value corresponds to the on-going V2X service, the UE performs a V2X communication transmission operation through the PC5 for transmitting the corresponding V2X message in the cell camped with the currently registered PLMN.

That is, when the V2X message having the lowest PPPP value is the corresponding V2X service of the V2X message which is newly generated, the UE performs the V2X communication transmission operation through the PC5 for transmitting the corresponding V2X message by changing to the cell (or PLMN) providing the corresponding carrier frequency corresponding to the mapping of the carrier frequency with the V2X service type of the new V2X service.

In the case of performing the corresponding operation of II-1-b-i-2) in the above description, the UE may perform frequent cell reselection/handover or PLMN reselection for the V2X communication via the PC5. Therefore, a situation of II-1-b-i-2) is preferably avoided. To this end, in case of II-1-b-i-2), the UE may select A) or B) of the carrier frequency selection method described above.

Further, in order to perform operation II-1), the following operation may additionally be added in the PLMN selection operation triggered by the existing V2X communication via the PC5.

1. The ProSe layer of the UE delivers 'all carrier frequencies for the on-going V2X service and the new V2X service' to the lower layer (i.e., the AS layer or of the UE or the RRC layer of the UE).

2. The lower layer (i.e., the AS layer or of the UE or the RRC layer of the UE) finds a cell/PLMN supporting all of received carrier frequencies.

A. When the corresponding cell/PLMN is found, the UE selects the corresponding cell and moves to the corresponding cell by performing cell reselection or handover in the related art, or selects the corresponding PLMN and moves to the corresponding PLMN by selecting the PLMN triggered by the V2X communication through the PC5.

3. When the lower layer (i.e., the AS layer or of the UE or the RRC layer of the UE) may not find the cell/PLMN supporting all of received carrier frequencies, the lower layer performs operation II-1-b) described above.

In the aforementioned carrier frequency selecting method, which operation of A), B), and C) the UE performs is described below.

A case where the V2X message for the V2X service is generated and there is the current on-going V2X service (including even a case where the on-going V2X service is the same as the occurring V2X service):

With a progress state of the current on-going V2X service, the following case may occur:

1. A case where the UE operates through 'served by E-UTRAN' for the on-going V2X service:

i. A case where all derived carrier frequencies are the carrier frequency corresponding to 'served by E-UTRAN' according to the mapping of the carrier frequency with the service type of the new V2X service;

ii. A case where some of the derived carrier frequencies are the carrier frequency corresponding to 'served by E-UTRAN' according to the mapping of the carrier frequency with the service type of the new V2X service;

iii. A case where all derived carrier frequencies are the carrier frequency corresponding to 'Not served by E-UTRAN' according to the mapping of the carrier frequency with the service type of the new V2X service;

2. A case where the UE operates through 'Not served by E-UTRAN' for the on-going V2X service (a case where the V2X communication through the PC5 for the on-going V2X service is in progress at a predetermined carrier frequency)

i. A case where all derived carrier frequencies are the carrier frequency corresponding to 'Not served by E-UTRAN' according to the mapping of the carrier frequency with the service type of the new V2X service;

ii. A case where some of the derived carrier frequencies are the carrier frequency corresponding to 'Not served by E-UTRAN' according to the mapping of the carrier frequency with the service type of the new V2X service;

iii. A case where all derived carrier frequencies are the carrier frequency corresponding to 'served by E-UTRAN' according to the mapping of the carrier frequency with the service type of the new V2X service;

The operation of the UE according to the above case will be described below.

I. In case of 1-i), the UE preferably selects A) in the carrier frequency selecting method.

II. In case of 1-ii), the UE may select A) and C) in the carrier frequency selecting method.

III. In case of 1-iii), the UE may select C) in the carrier frequency selecting method.

IV. In case of 2), the UE may select the carrier for the new V2X service regardless of the on-going V2X service. That is, in case of 2), the UE may select any of A) and C).

Of course, in case of B) in the carrier frequency selecting method, the on-going V2X service is available when there may be the carrier frequency corresponding to the mode depending on the carrier frequency selected by the new V2X service among the carrier frequencies derived according to the mapping of the carrier frequency with the service type. For example, when the corresponding condition is satisfied in II), III), and IV), the UE may select/perform B).

Hereinafter, the operation of the UE will be described in more detail.

Method 1) Method in which the ProSe Layer of the UE Performs a Carrier Frequency Selecting Operation 1. When the ProSe layer of the UE delivers the carrier frequency mapped to the V2X service type to the UE lower layer (i.e., the AS layer of the UE or the RRC layer of the UE), the UE performs the carrier frequency selecting operation to deliver only the carrier frequency suitable for a carrier frequency selection condition to the lower layer.

2. The lower layer receiving the selected carrier frequency selects the carrier frequency to be transmitted among the provided carrier frequencies according to the operation in the related art and transmits the corresponding V2X message.

Method 2) Method in which the UE lower layer (i.e., the AS layer of the UE or the RRC layer of the UE) performs the carrier frequency selecting operation 1. The ProSe layer of the UE delivers the carrier frequency mapped to the V2X service type to the UE lower layer (i.e., the AS layer of the UE or the RRC layer of the UE) in the related art.

2. The lower layer receiving the carrier frequency may select the carrier frequencies suitable for the carrier frequency selection condition among the provided carrier frequencies, select the carrier frequency to be transmitted among the carrier frequencies, and transmit the corresponding V2X message.

The following matters may be commonly applied to the first and second embodiments described above.

- The new V2X service may mean a V2X service other than the on-going V2X service and also include the on-going V2X service. A latter case may be applied to a case of selecting the carrier frequency for each V2X message (considering the mapping of the carrier frequency with the V2X service type).
- The application of the operation of the embodiment proposed above may be excluded in a situation in which transmission should be performed at a specific carrier frequency for a counterpart receiving UE (a case where the receiving UE may perform transmission/reception only at a specific carrier frequency).
- In the foregoing description, the carrier frequency may mean one or more carrier frequencies. For example, the selected carrier frequency may mean one or more carrier frequencies.
- When the UE selects the carrier frequency selection and provides the selected carrier frequency list according to the aforementioned embodiment, the RRC layer of the UE selects the carrier frequency to be used for transmission in the provided and selected carrier frequency list and performs the V2X communication (i.e., sidelink V2X communication) via the PC5. A concrete step example is as follows.

1. The carrier frequency is derived by mapping between the service type and carrier frequency.

2. Carrier frequency selection is performed according to the embodiment of the present invention.

3. The carrier frequency to use for transmission is selected at the selected carrier frequency in the RRC layer of the UE.

Although the above description has been made only for the V2X service, the embodiment of the present invention described above may be applied to a case where various D2D services (i.e., side link services) are mixed. For example, the embodiments may be applied to a case where a ProSe service (for example, a commercial or public safety service) and the V2X service are mixed.

[Third Embodiment] Carrier Frequency Selecting Method for V2X Communication Through PC5

FIG. 8 is a diagram exemplifying a carrier frequency selecting method for V2X communication through a PC5 according to an embodiment of the present invention.

Step 1) The UE-ProSe layer may provide service identifier or service type information to the lower layer together with the carrier frequency(s). Sequence number or bitmap information unique to each service type/identifier may be provided instead of the service identifier or service type.

The UE-ProSe layer may perform step 1 whenever every V2X message transmission is triggered. Alternatively, in order to reduce the signaling overhead, the UE-ProSe layer may performs step 1 only when there is a different carrier frequency from a set of carrier frequencies previously provided to the UE-RRC layer or step 1 only when a new service type occurs.

Step 2) When no service identifier or service type information is given in step 1, the UE-RRC layer may perform step 2 for all carrier frequencies currently selected for transmission (for all services regardless of the service).

On the contrary, when the service identifier or service type information is given in step 1, the UE-RRC layer may perform step 2 for each service identifier or service type. In this case, the sequence number or bitmap information unique to each service type/identifier may be provided instead of the service identifier or service type.

In addition, the UE-RRC layer may perform step 2 every time step 1 is performed.

Alternatively, in order to reduce the signaling overhead, the UE-RRC layer does not perform step 2 every time step 1 is performed, but the UE-RRC layer may perform step 2 only when the selected carrier frequency is different from the previously selected carrier frequency.

Step 3) The UE-ProSe layer determines whether the UE is in the Served by E-UTRAN mode for the V2X communication via PC5 or in the Not served by E-UTRAN mode for the V2X communication via the PC5.

The carrier frequency for transmission is provided with the V2X message to be transmitted in the V2X communication through the PC5 as described in Section 6.1.2.2 of 3GPP TS 24.386 (see step 4 of FIG. 9, described below).

In this case, the carrier frequency for transmission may be the same as the carrier frequency selected in step 2 above. Alternatively, when considering a fifth embodiment to be described below, the carrier frequency for transmission may be provided with an additional carrier frequency other than the carrier frequency selected in step 2 above.

The UE-RRC layer (i.e., lower layer) transmits the corresponding V2X message on the carrier frequency for transmission (see step 5 of FIG. 9 described below).

By performing the "carrier frequency selecting method" of the second embodiment, the UE may reflect the carrier frequency selecting method to the selection of the carrier frequency. In this regard, the operation of the UE for preventing the unnecessary PLMN selection operation of FIG. 9 will be described in more detail.

FIG. 9 exemplifies an operation of a UE related with carrier frequency selection and V2X message transmission according to an embodiment of the present invention.

In FIG. 9, steps 1 to 3 are the same as steps 1 to 3 of FIG. 8, and the description thereof will be omitted.

Referring to FIG. 9, the "carrier frequency selecting method" of the second embodiment described above may be performed by the UE-ProSe layer before step 1 of FIG. 9 is performed.

Alternatively, the "carrier frequency selecting method" of the second embodiment described above may be performed by the UE-RRC layer before performing step 2 after step 1.

Step 4) The UE-ProSe layer provides the carrier frequency for transmission to the UE-RRC layer together with the V2X message.

Step 5) The UE-RRC layer (i.e., lower layer) transmits the corresponding V2X message on the carrier frequency for transmission.

Meanwhile, in the 3GPP RAN2 #97 meeting, the conditions for the RRC connection establishment and the conditions of the sidelink UE information for the V2X side link communication are updated to support the cross-carrier operation.

The next modified part shows a condition that the UE may request the radio resource for the V2X communication to the network (or eNB) by transmitting a SidelinkUEInformation message. A first part is for reception and a second part is for transmission.

1> if SystemInformationBlockType21 including s1-V2X-ConfigCommon is broadcast by the PCell:
  2> ensure having a valid version of SystemInformationBlockType21 for the PCell;
  2> if configured by upper layers to receive V2X sidelink communication on a primary frequency or on one or more frequencies included in v2x-InterFreqInfoList, if included in SystemInformationBlockType21 of the PCell:
    3> if the UE did not transmit a SidelinkUEInformation message since last entering RRC_CONNECTED state; or
    3> if since the last time the UE transmitted a SidelinkUE-Information message the UE connected to a PCell not broadcasting SystemInformationBlockType21 including s1-V2X-ConfigCommon; or
    3> if the last transmission of the SidelinkUEInformation message did not include v2x-CommRxInterestedFreqList; or if the frequency(ies) configured by upper layers to receive V2X sidelink communication on has changed since the last transmission of the SidelinkUEInformation message:
      4> initiate transmission of the SidelinkUEInformation message to indicate the V2X sidelink communication reception frequency(ies) of interest in accordance with 5.10.2.3;
  2> else:
    3> if the last transmission of the SidelinkUEInformation message included v2x-CommRxInterestedFreqList:
      4> initiate transmission of the SidelinkUEInformation message to indicate it is no longer interested in V2X sidelink communication reception in accordance with 5.10.2.3;
  2> if configured by upper layers to transmit V2X sidelink communication on a primary frequency or on one or more frequencies included in v2x-InterFreqInfoList, if included in SystemInformationBlockType21 of the PCell:
    3> if the UE did not transmit a SidelinkUEInformation message since last entering RRC_CONNECTED state; or
    3> if since the last time the UE transmitted a SidelinkUE-Information message the UE connected to a PCell not broadcasting SystemInformationBlockType21 including s1-V2X-ConfigCommon; or
    3> if the last transmission of the SidelinkUEInformation message did not include v2x-CommTxResourceReq; or if the information carried by the v2x-CommTxResourceReq has changed since the last transmission of the SidelinkUE-Information message:
      4> initiate transmission of the SidelinkUEInformation message to indicate the V2X sidelink communication transmission resources required by the UE in accordance with 5.10.2.3;
  2> else:
    3> if the last transmission of the SidelinkUEInformation message included v2x-CommTxResourceReq:
      4> initiate transmission of the SidelinkUEInformation message to indicate it no longer requires V2X sidelink communication transmission resources in accordance with 5.10.2.3;

As described above, the conditions of the sidelink UE information for the V2X side link communication may be divided into two following cases.

A. A case where the V2X sidelink communication is configured to be transmitted and received on a primary frequency by the upper layer B. A case where when SIB 21 (i.e., SystemInformationBlockType 21) of the primary cell (PCell) is included, the V2X sidelink communication is configured to be transmitted and received on one or more frequencies included in the other frequency information list (i.e., v2x-InterFreqInfoList) for V2X in the SIB 21 by the upper layer In case A above, the primary frequency refers to an operating frequency of the E-UTRAN cell where the UE camps. In case B above, one or more frequencies refer to the carrier frequency provided by the E-UTRAN cell where the UE camps.

Observation A: The cell/base station does not provide radio resources other than the operating frequency provided in the SIB 21. Accordingly, the UE may request radio resources (transmission/reception) for only the operating frequency or frequencies provided within the SIB 21.

In the 3GPP meeting, '3GPP TS 24.386 6.1.2.1 Opening' includes the following changes.

If the UE is camped on an E-UTRAN cell indicating that V2X communication over PC5 is supported by the network, but not broadcasting any carrier frequencies and radio resources for V2X communication over PC5, the UE shall request radio resources for V2X communication over PC5.

According to observation A above, in the above situation, since there is no carrier frequency provided in the SIB 21, the serving cell may only provide radio resources for the operating carrier frequency. This means that the UE may only request the radio resources for the operating carrier frequency.

Observation 1-1) When the UE camps on the E-UTRAN cell that does not broadcast the carrier frequency and radio resources for the V2X communication via any PC5, although the V2X communication via the PC5 is indicated to be supported by the network, the UE may only request the radio resources for the operating carrier frequency.

The above situation may be divided into two cases depending on whether the E-UTRAN cell is operating on a carrier frequency belonging to a provisioned carrier frequency that the UE intends to use.

When the UE camps on an E-UTRAN cell that does not broadcast the carrier frequency and radio resources for the V2X communication via any PC5 although the V2X communication via the PC5 is indicated to be supported by the network, A. A case where the E-UTRAN cell operates on the carrier frequency belonging to the provisioned carrier frequency which the UE intends to use B. A case where the E-UTRAN cell operates on the carrier frequency not belonging to the provisioned carrier frequency which the UE intends to use According to observation 1-1 above, case A is a valid scenario in which the UE is served by the E-UTRAN because the serving cell may provide the radio resources for the operating carrier frequency. However, in case of case B, the UE may not be serviced by the E-UTRAN because the serving cell will not provide the radio resources other than the operating carrier frequency. Thus, in case of case B, the UE should be in the Not-served by E-UTRAN mode for the V2X communication via the PC5.

Proposal 1-1: Therefore, it is desirable that the following definition be added.

When the UE camps on the E-UTRAN cell indicating the V2X communication via the PC5 is supported by the network and operating on the carrier frequency not belonging to the provisioned carrier frequency for the V2X communication via the PC5 which the UE intends to use and not broadcasting any carrier frequency and radio resource for the V2X communication via the PC5, the UE is in 'Not served by E-UTRAN' mode.

In the 3GPP meeting, the following changes are agreed in '3GPP TS 24.386 3.1 Definition'.

The UE is defined as being "Not served by E-UTRAN" for the V2X communication when the UE:
- deviates from E-UTRAN;
- is within the E-UTRAN coverage, but does not camp on any cell;
- is within the E-UTRAN coverage, but does not camp on a non-E-UTRAN cell;
- camps on the E-UTRAN cell which does not indicate that the V2X communication through the PC5 is supported by the network;
- camps on an E-UTRAN cell indicating that the V2X communication through the PC5 is supported by the network and providing the carrier frequency and/or radio resource for the V2X communication through the PC5 which does not belong to a provisioned carrier frequency which the UE intends to use.

In the above contents, 'or radio resource' is to cover a scenario where the serving cell provides only the radio resources for the operating carrier frequency.

Proposal 2: It is proposed to add the following changes to the definition of 'Not served by E-UTRAN for V2X communication'.

When the UE camps on the E-UTRAN cell indicating the V2X communication via the PC5 is indicated to be supported by the network and providing the carrier frequency not belonging to the provisioned carrier frequency for the V2X communication via the PC5 which the UE intends to use and operating at the provisioned carrier frequency not belonging to the carrier frequency for the V2X communication via the PC5 which the UE intends to use, the UE is in 'Not served by E-UTRAN' mode.

According to 3GPP TS 24.386 Section 6.1.2.3, the following is described.

6.1.2.3 Procedure for UE to use provisioned radio resources for V2X communication over PC5

When the UE is not served by E-UTRAN for V2X communication, the UE shall select the radio parameters to be used for V2X communication over PC5 as follows:

. . . .

If the lower layers find that there exists a cell operating the provisioned radio resources (i.e., carrier frequency), and the cell belongs to the registered PLMN or a PLMN equivalent to the registered PLMN, and the UE is authorized for V2X communication over PC5 in this PLMN, the UE can use the radio parameters indicated by the cell as specified in 3GPP TS 36.331.

else if the lower layers report that one or more PLMNs operate in the provisioned radio resources (i.e. carrier frequency) then: . . . .

According to the aforementioned contents, when the UE is not served by the E-UTRAN, the UE attempts to find a cell operating the provisioned radio resource. However, after introduction of the cross-carrier operation, this is no longer valid. Instead, the UE must find the cell providing the carrier frequency or a cell operating on the carrier frequency belonging to the provisioned carrier frequency for the V2X communication via the PC5 which the UE intends to use.

Proposal 3) When the UE is not served by the E-UTRAN or performs the PLMN selection triggered by the V2X communication, if the UE needs to find a cell to perform the V2X communication via the PC5, the UE must find the cell on the carrier frequency belonging to the provisioned carrier frequency for the V2X communication via the PC5 which the UE intends to use.

A method for implementing proposal 3 above is as follows.

6.1.2.3 Procedure for UE to Use Provisioned Radio Resources for V2X Communication Over PC5

When the UE is not served by E-UTRAN for V2X communication, the UE shall select the radio parameters to be used for V2X communication over PC5 as follows:
- if the UE can determine itself located in a geographical area, and the UE is provisioned with radio parameters for the geographical area, the UE shall select the radio parameters associated with that geographical area; or
- in all other cases, the UE shall not initiate V2X communication over PC5.

When the UE is in coverage of a 3GPP RAT it can for example use information derived from the serving PLMN. When the UE is not in coverage of a 3GPP RAT it can use other techniques, e.g. Global Navigation Satellite System (GNSS). The UE shall not consider user provided location as a valid input to locate itself in a specific geographical area.

If the UE intends to use "non-operator managed" radio parameters, the UE shall initiate V2X communication over PC5 with the selected radio parameters.

If the UE intends to use "operator managed" radio parameters, before initiating V2X communication over PC5, the UE shall check with lower layers whether the selected radio parameters can be used in the current location without causing interference to other cells, and:
- if the lower layers indicate that the usage would not cause any interference, the UE shall initiate V2X communication over PC5; or If the lower layers find that there exists a cell providing carrier frequencies or operating on the carrier frequency which belong to the provisioned carrier frequency that the UE intends to use (i.e., carrier frequency), and the cell belongs to the registered PLMN or a PLMN equivalent to the registered PLMN, and the UE is authorized for V2X communication over PC5 in this PLMN, the UE can use the radio parameters indicated by the cell as specified in 3GPP TS 36.331.

else if the lower layers report that one or more PLMNs providing carrier frequencies or operating on the carrier frequency which belong to the provisioned carrier frequency that the UE intends to use then:

a) if the following conditions are met:
1) none of the PLMNs reported by the lower layers is the registered PLMN or equivalent to the registered PLMN;
2) at least one of the PLMNs reported by the lower layers is in the list of authorized PLMNs for V2X communication over PC5 and provides radio resources for V2X communication over PC5 as specified in 3GPP TS 36.331; and
3) the UE does not have an emergency PDN connection;
then the UE shall:
1) if in EMM-IDLE mode, perform PLMN selection triggered by V2X communication over PC5; or
2) else if in EMM-CONNECTED mode, either:
i) perform a detach procedure as specified in 3GPP TS 24.301 [11] and then perform PLMN selection triggered by V2X communication over PC5; or
ii) not initiate V2X communication over PC5.

Whether the UE performs i) or ii) above is left up to UE implementation; or b) else the UE shall not initiate V2X communication over PC5.

If the registration to the selected PLMN is successful, the UE shall proceed with the procedure to initiate V2X communication over PC5.

If the UE is performing V2X communication over PC5 using radio parameters associated with a geographical area and moves out of that geographical area, the UE shall stop performing V2X communication over PC5 and then:

if the UE is not served by E-UTRAN for V2X communication or the UE intends to use radio resources for V2X communication over PC5 other than those operated by the serving E-UTRAN cell, the UE shall select appropriate radio parameters for the new geographical area as specified above; or if the UE is served by E-UTRAN for V2X communication and intends to use radio resources for V2X communication over PC5 operated by the serving E-UTRAN cell, the UE shall proceed with the procedure to initiate V2X communication over PC5 when served by E-UTRAN for V2X communication.

Hereinafter, PLMN selection method triggered by V2X communication over PC5 is described.

3.1C PLMN Selection Triggered by V2X Communication Over PC5

If the MS supports V2X communication over PC5 and needs to perform PLMN selection for V2X communication over PC5, then the MS shall proceed as follows:

i) the MS shall store a duplicate value of the RPLMN and a duplicate of the PLMN selection mode that were in use before PLMN selection due to V2X communication over PC5 was initiated, unless this PLMN selection due to V2X communication over PC5 follows another PLMN selection due to V2X communication over PC5 or a manual CSG selection;

ii) the MS shall enter into Automatic mode of PLMN selection taking into account the additional requirements in items iii) to x) below;

iii) Among the PLMNs advertised by the E-UTRA cell providing carrier frequencies or operating on the carrier frequency which belong to the provisioned carrier frequency that the UE intends to use for V2X communication over PC5, the MS shall choose one allowable PLMN which:

1) provides radio resources for V2X communication over PC5;

2) is in the list of authorised PLMNs for V2X communication over PC5; and 3) is not in the list of "PLMNs with E-UTRAN not allowed";

if conditions 1) through 3) above are met then the MS shall attempt to register on that PLMN. If none of the PLMNs meet conditions 1) through 3) above, the MS shall return to the stored duplicate PLMN selection mode and use the stored duplicate value of RPLMN for further action;

iv) if the registration fails due to "PLMN not allowed" or "EPS services not allowed", then the MS shall update the appropriate list of forbidden PLMNs, and shall either:

A) if the PLMN provides common radio resources needed by the MS to do V2X communication over PC5, perform V2X communication over PC5 on the selected PLMN in limited service state. In this case the MS shall not search for available and allowable PLMNs during the duration of V2X communication over PC5;

B) return to the stored duplicate PLMN selection mode and use the stored duplicate value of RPLMN for further action; or C) perform the action described in iii) again with the choice of PLMNs further excluding the PLMNs on which the MS has failed to register.

Whether the MS performs A), B) or C) above is left up to MS implementation.

v) if the registration fails due to causes other than "PLMN not allowed" or "EPS services not allowed", the MS shall:

if the handling of the failure requires updating a list of forbidden PLMNs, update the appropriate list; and if the handling of the failure does not require updating a list of forbidden PLMNs, remember the PLMN as a PLMN on which the MS has failed to register;

and the MS shall either:

A1) return to the stored duplicate PLMN selection mode and use the stored duplicate value of RPLMN for further action;

B1) perform the action described in iii) again with the choice of PLMNs further excluding the PLMNs on which the MS has failed to register; or C1) perform V2X communication over PC5 in limited service state on a PLMN advertised by the cell operating in the radio resources provisioned to the MS for V2X communication over PC5, if registration on this PLMN has previously failed due to "PLMN not allowed" or "EPS services not allowed" and if this PLMN provides common radio resources needed by the MS to do V2X communication over PC5. In this case the MS shall not search for available and allowable PLMNs during the duration of V2X communication over PC5;

Whether the MS performs A1), B1) or C1) above is left up to MS implementation.

vi) if the MS is no longer in the coverage of the selected PLMN, then the MS shall either:

A2) perform V2X communication over PC5 procedures for MS to use provisioned radio resources; or B2) return to the stored duplicate PLMN selection mode and use the stored duplicate value of RPLMN for further action.

Whether the MS performs A2) or B2) above is left up to MS implementation.

vii) if the MS is unable to find a suitable cell on the selected PLMN as specified in 3GPP TS 24.386 [59], then the MS shall either:

A3) if the PLMN provides common radio resources needed by the MS to do V2X communication over PC5, perform V2X communication over PC5 on the selected PLMN in limited service state. In this case the MS shall not search for available and allowable PLMNs during the duration of V2X communication over PC5; or B3) return to the stored duplicate PLMN selection mode and use the stored duplicate value of RPLMN for further action.

Whether the MS performs A3) or B3) above is left up to MS implementation.

viii) if the MS is switched off while on the selected PLMN and switched on again, the MS shall use the stored duplicate value of RPLMN as RPLMN and behave;

ix) if the user initiates a PLMN selection while on the selected cell, the MS shall delete the stored duplicate value of PLMN selection mode, use the stored duplicate value of RPLMN as RPLMN and follow the procedures. The MS shall delete the stored duplicate value of RPLMN once the MS has successfully registered to the selected PLMN; and x) if the MS no longer needs to perform V2X communication over PC5, the MS shall return to the stored duplicate PLMN selection mode and use the stored duplicate value of RPLMN for further action.

If the PLMN selected for V2X communication over PC5 is a VPLMN, the MS shall not periodically scan for higher priority PLMNs during the duration of V2X communication over PC5.

The solution to prevent potential ping-pong between the RPLMN and the PLMN selected for V2X communication over PC5 is MS implementation specific.

Further, in order to implement the above operation, the ProSe layer of the UE preferably delivers a command/instruction to the lower layer of the UE (i.e., the AS layer of the UE or the RRC layer of the UE) to find the following cell.

E-UTRAN cell operating or providing the carrier frequency belonging to the provisioned carrier frequency which the UE intends to use The lower layer (i.e., the AS layer of the UE or the RRC layer of the UE) of the UE receiving the notification informs the upper layer (i.e., the ProSe layer of the UE) when finding the corresponding cell.

Further, when the V2X communication via the PC5 is indicated to be supported by the network and when the UE camps on the E-UTRAN cell providing the carrier frequency and/or radio resource for the V2X communication through the PC5 which does not belong to the provisioned carrier frequency which the UE intends to use, the UE is defined as the 'Not served by E-UTRAN' mode.

Here, the reason for defining 'or radio resource' is to cover the scenario where the serving cell provides only the radio resources for the operating carrier frequency.

Therefore, when the UE camps on the E-UTRAN cell indicating that the V2X communication via the PC5 is supported by the network, and operating on the carrier frequency, and providing the carrier frequency for the V2X communication via the PC5, and in which both carrier frequencies do not belong to the provisioned carrier frequency which the UE intends to use, the UE is preferably defined as the 'Not served by E-UTRAN' mode.

Further, when the UE is 'not served by E-UTRAN', the UE attempts to find the cell operating the provisioned radio resource. However, after the introduction of the cross-carrier operation, this may be no longer valid. The UE may have to find the cell that provides the carrier frequency operating on the carrier frequency that belongs to the provisioned carrier frequency which the UE intends to use.

Thus, when the UE is 'not served by E-UTRAN' or when the UE performs the PLMN selection triggered by the V2X communication, if the UE needs to find the cell to perform the V2X communication via the PC5, it is preferable to find the cell that provides the carrier frequency that operates on the carrier frequency that belongs to the provisioned carrier frequency which the UE intends to use. In order to support such an operation, the following needs to be performed.

6.1.2.3 Procedure for UE to Use Provisioned Radio Resources for V2X Communication Over PC5

When the UE is not served by E-UTRAN for V2X communication, if radio parameters (i.e. carrier frequencies) is selected according to V2X service identifier to V2X frequency mapping rules for V2X communication over PC5, the UE shall use the selected radio parameters. Otherwise, the UE shall select the radio parameters to be used for V2X communication over PC5 as follows:

if the UE can determine itself located in a geographical area, and the UE is provisioned with radio parameters for the geographical area, the UE shall select the radio parameters associated with that geographical area; or
in all other cases, the UE shall not initiate V2X communication over PC5.

When the UE is in coverage of a 3GPP RAT it can for example use information derived from the serving PLMN. When the UE is not in coverage of a 3GPP RAT it can use other techniques, e.g. Global Navigation Satellite System (GNSS). The UE shall not consider user provided location as a valid input to locate itself in a specific geographical area.

If the UE intends to use "non-operator managed" radio parameters, the UE shall initiate V2X communication over PC5 with the selected radio parameters.

If the UE intends to use "operator managed" radio parameters, before initiating V2X communication over PC5, the UE shall check with lower layers whether the selected radio parameters can be used in the current location without causing interference to other cells as specified in 3GPP TS 36.331 [23], and:

if the lower layers indicate that the usage would not cause any interference, the UE shall initiate V2X communication over PC5; or If the lower layers find that there exists a cell providing carrier frequencies or operating on carrier frequency which belong to the provisioned carrier frequency for V2X communication over PC5 that the UE intends to use and the cell belongs to the registered PLMN or a PLMN equivalent to the registered PLMN, and the UE is authorized for V2X communication over PC5 in this PLMN, the UE can use the radio parameters indicated by the cell.

else if the lower layers report that one or more PLMNs providing carrier frequencies or operating on carrier frequency which belong to the provisioned carrier frequency for V2X communication over PC5 that the UE intends to use then:
a) if the following conditions are met:
1) none of the PLMNs reported by the lower layers is the registered PLMN or equivalent to the registered PLMN;
2) at least one of the PLMNs reported by the lower layers is in the list of authorized PLMNs for V2X communication over PC5 and provides radio resources for V2X communication over PC5; and
3) the UE does not have an emergency PDN connection;
then the UE shall:
1) if in EMM-IDLE mode, perform PLMN selection triggered by V2X communication over PC5 or
2) else if in EMM-CONNECTED mode, either:
i) perform a detach procedure and then perform PLMN selection triggered by V2X communication over PC5; or
ii) not initiate V2X communication over PC5.
Whether the UE performs i) or ii) above is left up to UE implementation; or
b) else the UE shall not initiate V2X communication over PC5.

If the registration to the selected PLMN is successful, the UE shall proceed with the procedure to initiate V2X communication over PC5.

If the UE is performing V2X communication over PC5 using radio parameters associated with a geographical area and moves out of that geographical area, the UE shall stop performing V2X communication over PC5 and then:

if the UE is not served by E-UTRAN for V2X communication or the UE intends to use radio resources for V2X communication over PC5 other than those operated by the serving E-UTRAN cell, the UE shall select appropriate radio parameters for the new geographical area as specified above; or
if the UE is served by E-UTRAN for V2X communication and intends to use radio resources for V2X communication over PC5 operated by the serving E-UTRAN cell, the UE shall proceed with the procedure to initiate V2X communication over PC5 when served by E-UTRAN for V2X communication.

3.1C PLMN Selection Triggered by V2X Communication Over PC5

If the MS supports V2X communication over PC5 and needs to perform PLMN selection for V2X communication over PC5, then the MS shall proceed as follows:

i) the MS shall store a duplicate value of the RPLMN and a duplicate of the PLMN selection mode that were in use before PLMN selection due to V2X communication over PC5 was initiated, unless this PLMN selection due to V2X communication over PC5 follows another PLMN selection due to V2X communication over PC5 or a manual CSG selection;

ii) the MS shall enter into Automatic mode of PLMN selection taking into account the additional requirements in items iii) to x) below;

iii) Among the PLMNs advertised by the E-UTRA cell providing carrier frequencies or operating on carrier frequency which belong to the provisioned carrier frequency for V2X communication over PC5 that the MS intends to use for V2X communication over PC5, the MS shall choose one allowable PLMN which:

1) provides radio resources for V2X communication over PC5;

2) is in the list of authorised PLMNs for V2X communication over PC5; and 3) is not in the list of "PLMNs with E-UTRAN not allowed";

if conditions 1) through 3) above are met then the MS shall attempt to register on that PLMN. If none of the PLMNs meet conditions 1) through 3) above, the MS shall return to the stored duplicate PLMN selection mode and use the stored duplicate value of RPLMN for further action;

iv) if the registration fails due to "PLMN not allowed" or "EPS services not allowed", then the MS shall update the appropriate list of forbidden PLMNs, and shall either:

A) if the PLMN provides common radio resources needed by the MS to do V2X communication over PC5, perform V2X communication over PC5 on the selected PLMN in limited service state. In this case the MS shall not search for available and allowable PLMNs during the duration of V2X communication over PC5;

B) return to the stored duplicate PLMN selection mode and use the stored duplicate value of RPLMN for further action; or C) perform the action described in iii) again with the choice of PLMNs further excluding the PLMNs on which the MS has failed to register.

Whether the MS performs A), B) or C) above is left up to MS implementation.

v) if the registration fails due to causes other than "PLMN not allowed" or "EPS services not allowed", the MS shall:
  if the handling of the failure requires updating a list of forbidden PLMNs, update the appropriate list; and
  if the handling of the failure does not require updating a list of forbidden PLMNs, remember the PLMN as a PLMN on which the MS has failed to register;
and the MS shall either:

A1) return to the stored duplicate PLMN selection mode and use the stored duplicate value of RPLMN for further action;

B1) perform the action described in iii) again with the choice of PLMNs further excluding the PLMNs on which the MS has failed to register; or C1) perform V2X communication over PC5 in limited service state on a PLMN advertised by the cell operating in the radio resources provisioned to the MS for V2X communication over PC5, if registration on this PLMN has previously failed due to "PLMN not allowed" or "EPS services not allowed" and if this PLMN provides common radio resources needed by the MS to do V2X communication over PC5. In this case the MS shall not search for available and allowable PLMNs during the duration of V2X communication over PC5;

Whether the MS performs A1), B1) or C1) above is left up to MS implementation.

vi) if the MS is no longer in the coverage of the selected PLMN, then the MS shall either:

A2) perform V2X communication over PC5 procedures for MS to use provisioned radio resources; or B2) return to the stored duplicate PLMN selection mode and use the stored duplicate value of RPLMN for further action.

Whether the MS performs A2) or B2) above is left up to MS implementation.

vii) if the MS is unable to find a suitable cell on the selected PLMN, then the MS shall either:

A3) if the PLMN provides common radio resources needed by the MS to do V2X communication over PC5, perform V2X communication over PC5 on the selected PLMN in limited service state. In this case the MS shall not search for available and allowable PLMNs during the duration of V2X communication over PC5; or B3) return to the stored duplicate PLMN selection mode and use the stored duplicate value of RPLMN for further action.

Whether the MS performs A3) or B3) above is left up to MS implementation.

viii) if the MS is switched off while on the selected PLMN and switched on again, the MS shall use the stored duplicate value of RPLMN as RPLMN and behave;

ix) if the user initiates a PLMN selection while on the selected cell, the MS shall delete the stored duplicate value of PLMN selection mode, use the stored duplicate value of RPLMN as RPLMN and follow the procedures. The MS shall delete the stored duplicate value of RPLMN once the MS has successfully registered to the selected PLMN; and x) if the MS no longer needs to perform V2X communication over PC5, the MS shall return to the stored duplicate PLMN selection mode and use the stored duplicate value of RPLMN for further action.

If the PLMN selected for V2X communication over PC5 is a VPLMN, the MS shall not periodically scan for higher priority PLMNs during the duration of V2X communication over PC5.

Further, in order to implement the above operation, the ProSe layer of the UE preferably delivers a command/instruction to the lower layer of the UE (i.e., the AS layer of the UE or the RRC layer of the UE) to find the following cell.

E-UTRAN cell operating or providing the carrier frequency belonging to the provisioned carrier frequency which the UE intends to use The lower layer (i.e., the AS layer of the UE or the RRC layer of the UE) of the UE receiving the notification informs the upper layer (i.e., the ProSe layer of the UE) when finding the corresponding cell.

Hereinafter, the carrier frequency selection and the mapping between the V2X service and the V2X frequency will be described.

6.1.2.1 Initiation

The upper layers can request the UE to send a V2X message of a V2X service identified by a V2X service identifier using V2X communication over PC5. The request from the upper layers includes:

a) the V2X message;

b) the V2X service identifier of the V2X service for the V2X message;

c) the type of data in the V2X message (IP or non-IP);

d) if the V2X message contains non-IP data, the V2X message family (see subclause 7.1) of data in the V2X message; and e) the V2X message priority.

Upon a request from upper layers to send a V2X message of a V2X service identified by a V2X service identifier using V2X communication over PC5, the UE shall proceed as follows:

a) if the following conditions are met:

1) the UE is served by E-UTRAN for V2X communication;

. . . .

then the UE shall:

1) if the UE is configured with V2X service identifier to V2X frequency mapping rules for V2X communication over PC5 and there is one or more V2X frequencies associated with the V2X service identifier of the V2X service for the V2X message in the current the geographical area, pass the one or more V2X frequencies associated with the V2X service identifier of the V2X service for the V2X message to the lower layers;

2) request radio resources for V2X communication over PC5 as specified in 3GPP TS 24.334 subclause 10.2.2; and 3) perform transmission of V2X communication over PC5 as specified in subclause 6.1.2.2; and b) if the following conditions are met:

1) the UE is:

A) not served by E-UTRAN for V2X communication; or

. . . .

then the UE shall:

1) if the UE is configured with V2X service identifier to V2X frequency mapping rules for V2X communication over PC5 and there is one or more V2X frequencies associated with the V2X service identifier of the V2X service for the V2X message in the current the geographical area, pass the one or more V2X frequencies associated with the V2X service identifier of the V2X service for the V2X message to the lower layers;

2) select radio resources for V2X communication over PC5 as specified in subclause 6.1.2.3; and 3) perform transmission of V2X communication over PC5 as specified in subclause 6.1.2.2;

else the UE shall not perform transmission of V2X communication over PC5.

According to the description given in Section 6.1.2.1 above, the UE operation that provides one or more frequencies to the lower layer is defined in both Served by E-UTRAN and Not-served by E-UTRAN modes. The UE operation is performed after determining whether the UE is served by the E-UTRAN or not.

Observation 2-1: In Section 6.1.2.1 of 3GPP TS 24.386, one or more carrier frequencies mapped to the service type are provided to the lower layer after determining whether the UE is served by the E-UTRAN.

According to the definition of 'Not served by E-UTRAN', the determination as to whether the UE is served by the E-UTRAN depends on the carrier frequency which the UE intends to use. Hence, the UE-ProSe layer needs to know the carrier frequency which the UE intends to use to determine whether the UE is served by the E-UTRAN.

Observation 2-2: The UE-ProSe layer needs to know the carrier frequency which the UE intends to use to determine whether the UE is served by the E-UTRAN.

However, as described above, the UE-ProSe layer does not know 'the carrier frequency which the UE intends to use' before one or more V2X frequencies are provided to the lower layer and the 'carrier frequency which the UE intends to use' is selected by the UE-RRC layer. Therefore, the UE may not determine whether the UE is served by the E-UTRAN because the 'carrier frequency which the UE intends to use' is not given at the determination time.

Observation 2-3: According to a current standard, the UE may not determine whether the UE is served by the E-UTRAN because the 'carrier frequency which the UE intends to use' is not given at the determination time.

Thus, before determining whether the UE is served by the E-UTRAN, it is preferable that the operation is performed in which one or more V2X frequencies mapped to the service type are provided to the lower layer.

Proposal 2-1: It is proposed that before determining whether the UE is served by the E-UTRAN, the operation is performed in which one or more V2X frequencies mapped to the service type are provided to the lower layer.

Further, in order to support observation 2-2 above, the 'carrier frequency which the UE intends to use' selected in the UE-RRC layer needs to be provided to the UE-ProSe layer to determine whether the UE is served by the E-UTRAN.

Observation 2-4: The 'carrier frequency which the UE intends to use' selected in the UE-RRC layer needs to be provided to the UE-ProSe layer to determine whether the UE is served by the E-UTRAN.

FIG. 8 exemplifies a series of operations between the UE-ProSe layer and the UE-RRC layer for determining whether the UE is served by the E-UTRAN by considering the mapping of the service type and the carrier frequency as described above.

Proposal 2-2: The UE-RRC layer may inform the UE-ProSe layer of 'the selected carrier frequency the UE intend to use'.

Currently, no carrier frequency selection procedure is defined for a UE for which V2X frequency and V2X service identifier mapping rules are not established for the V2X communication via the PC5. In the V2X communication via the PC5, which is different from direct communication in ProSe, multiple carrier frequencies may be provisioned. Therefore, even when the V2X frequency and V2X service identifier mapping rules are not established for the V2X communication via the PC5. The UE needs to select the carrier frequency which the UE intends to use.

When considering the UE behaviors if the UE is configured with V2X service identifier to V2X frequency mapping rules for V2X communication over PC5, the sequence of 'NOT configured case' to select 'a carrier frequency the UE intend to use' should be same with one of 'configured case' as described in FIG. 7.

Proposal 2-3: When the V2X frequency and V2X service identifier mapping rules are not established for the V2X communication via the PC5 in the UE, the UE-ProSe layer may provide the provisioning carrier frequency to the lower layer. The lower layer may select the 'carrier frequency which the UE intends to use' and provide the UE-ProSe layer with the 'selected carrier frequency which the UE intends to use'.

Hereinafter, UE behaviours when not served by E-UTRAN is described.

In subclause 6.1.2.3 of 3GPP TS 24.386, the selection of radio parameters is specified when the UE is not served by E-UTRAN. The selected radio parameters include a carrier frequency as well as radio resource in the corresponding carrier frequency.

6.1.2.3 Procedure for UE to use provisioned radio resources for V2X communication over PC5

When the UE is not served by E-UTRAN, the UE shall select the radio parameters to be used for V2X communication over PC5 as follows:

if the UE can determine itself located in a geographical area, and the UE is provisioned with radio parameters for the geographical area, the UE shall select the radio parameters associated with that geographical area; or in all other cases, the UE shall not initiate V2X communication over PC5.

As described above, 'the carrier frequency the UE intend to use' is selected in subclause 6.1.2.1 of 3GPP TS 24.386. However, when the UE is not served by E-UTRAN, during the selection of radio parameters in subclause 6.1.2.3 of 3GPP TS 24.386, the carrier frequency selection is performed again based on provisioned radio parameters for the geographical area. The carrier frequency selection in subclause 6.1.2.3 of 3GPP TS 24.386 does not consider 'the selected carrier frequency the UE intend to use' in subclause 6.1.2.1 of 3GPP TS 24.386.

Mapping of service type and carrier frequencies should be supported when the UE is served by E-UTRAN as well as not served by E-UTRAN. However, according current description in subclause 6.1.2.3 of 3GPP TS 24.386, the carrier frequency selected based on the mapping in subclause 6.1.2.1 of 3GPP TS 24.386 is not supported when the UE is 'Not served by E-UTRAN'.

Observation 3-1: The mapping of service type and carrier frequencies in subclause 6.1.2.1 of 3GPP TS 24.386 is not supported when the UE is not served by E-UTRAN.

Thus, the carrier frequency selection should be performed only once in subclause 6.1.2.1 of 3GPP TS 24.386 and the selected carrier frequency in subclause 6.1.2.1 of 3GPP TS 24.386 should be considered when the UE is not served by E-UTRAN and select radio parameters.

Proposal 3-1: when the UE is not served by E-UTRAN, the UE may select the radio parameters associated with that geographical area and 'the carrier frequency the UE intend to use' selected in subclause 6.1.2.1 of 3GPP TS 24.386.

In subclause 6.1.2.3 of 3GPP TS 24.386, the follow show cell/PLMN search to perform V2X communication over PC5 when the UE is not served by E-UTRAN.

6.1.2.3 Procedure for UE to use provisioned radio resources for V2X communication over PC5

When the UE is not served by E-UTRAN for V2X communication, the UE shall select the radio parameters to be used for V2X communication over PC5 as follows:

. . . .

If the lower layers find that there exists a cell operating the provisioned radio resources (i.e., carrier frequency), and the cell belongs to the registered PLMN or a PLMN equivalent to the registered PLMN, and the UE is authorized for V2X communication over PC5 in this PLMN, the UE can use the radio parameters indicated by the cell as specified in 3GPP TS 36.331.

else if the lower layers report that one or more PLMNs operate in the provisioned radio resources (i.e. carrier frequency) then:

However, after introducing cross-carrier operation (see the definition of 'Not served by E-UTRAN for V2X communication over PC5' or 'observation A)'), searching cells/PLMNs operating the provisioned radio resources is not valid any more when the UE is not served by E-UTRAN. Instead, the UE have to find a cell/PLMN providing carrier frequencies or operating on carrier frequency which belong to the provisioned carrier frequency for V2X communication over PC5 that the UE intends to use.

Observation 3-2: if the UE needs to find a cell/PLMN to perform V2X communication over PC5 when the UE is not served by E-UTRAN, the UE have to find a cell/PLMN providing carrier frequencies or operating on carrier frequency which belong to the provisioned carrier frequency for V2X communication over PC5 that the UE intends to use.

Proposal 3-2: The following is applied to subclause 6.1.2.3 of 3GPP TS 24.386 and subclause 3.1C of 3GPP TS 23.122.

The UE should find a cell/PLMN providing carrier frequencies or operating on carrier frequency which belongs to the provisioned carrier frequency for V2X communication over PC5 that the UE intends to use if the UE needs to find a cell/PLMN to perform V2X communication over PC5 when the UE is not served by E-UTRAN.

The procedure, operation and method reflecting the proposal 1-1 are as follows.

3.1 Definitions

Not served by E-UTRAN for V2X communication: the UE is either:

outside of E-UTRAN coverage;

within E-UTRAN coverage but not camped on any cell;

within E-UTRAN coverage but camped on a non-E-UTRAN cell;

camped on an E-UTRAN cell not indicating that V2X communication over PC5 is supported by the network;

camped on an E-UTRAN cell indicating that V2X communication over PC5 is supported by the network and providing carrier frequencies, and/or radio resources for V2X communication over PC5 which do not belong to the provisioned carrier frequency that the UE intends to use; or camped on an E-UTRAN cell indicating that V2X communication over PC5 is supported by the network, and operating on carrier frequency which do not belong to the provisioned carrier frequency for V2X communication over PC5 that the UE intends to use but not broadcasting any carrier frequencies and radio resources for V2X communication over PC5.

6.1.2.1 Initiation

The upper layers can request the UE to send a V2X message of a V2X service identified by a V2X service identifier using V2X communication over PC5. The request from the upper layers includes:

a) the V2X message;

b) the V2X service identifier of the V2X service for the V2X message;

c) the type of data in the V2X message (IP or non-IP);

d) if the V2X message contains non-IP data, the V2X message family of data in the V2X message; and e) the V2X message priority.

Upon a request from upper layers to send a V2X message of a V2X service identified by a V2X service identifier using V2X communication over PC5, the UE shall proceed as follows:

a) if the following conditions are met:

1) the UE is served by E-UTRAN for V2X communication;

2) the UE intends to use the radio resources (i.e. carrier frequency) provided by an E-UTRAN cell;

3) the registered PLMN is in the list of PLMNs in which the UE is authorized to use V2X communication over PC5 when the UE is served by E-UTRAN for V2X communication as specified in subclause 5.2.4 of 3GPP TS 24.386; and 4) the V2X service identifier of the V2X service is included in the list of V2X services authorized for V2X communication over PC5 as specified in subclause 5.2.4 of 3GPP TS 24.386 or the UE is configured with a default destination Layer-2 ID for V2X communication over PC5 as specified in subclause 5.2.4 of 3GPP TS 24.386;

then the UE shall:

1) if the UE is configured with V2X service identifier to V2X frequency mapping rules for V2X communication over PC5 as specified in subclause 5.2.4 of 3GPP TS 24.386 and there is one or more V2X frequencies associated with the V2X service identifier of the V2X service for the V2X message in the current the geographical area, pass the one or more V2X frequencies associated with the V2X service identifier of the V2X service for the V2X message to the lower layers;

2) request radio resources for V2X communication over PC5 as specified in subclause 10.2.2 of 3GPP TS 24.334; and 3) perform transmission of V2X communication over PC5 as specified in subclause 6.1.2.2 of 3GPP TS 24.386; and b) if the following conditions are met:

1) the UE is:

A) not served by E-UTRAN for V2X communication;

B) in limited service state as specified in 3GPP TS 23.122, if the reason for the UE being in limited service state is one of the following;

i) the UE is unable to find a suitable cell in the selected PLMN as specified in 3GPP TS 36.304;

ii) the UE received an ATTACH REJECT message or a TRACKING AREA UPDATE REJECT message or a SERVICE REJECT message with the EMM cause #11 "PLMN not allowed" as specified in 3GPP TS 24.301 or a LOCATION UPDATING REJECT message or a GPRS ATTACH REJECT message or a ROUTING AREA UPDATE REJECT message or SERVICE REJECT message with the EMM cause #11 "PLMN not allowed" as specified in 3GPP TS 24.008; or iii) the UE received an ATTACH REJECT message or a TRACKING AREA UPDATE REJECT message or a SERVICE REJECT message with the EMM cause #7 "EPS services not allowed" as specified in 3GPP TS 24.301 or a LOCATION UPDATING REJECT message or a GPRS ATTACH REJECT message or a ROUTING AREA UPDATE REJECT message or a SERVICE REJECT message with the EMM cause #7 "GPRS services not allowed" as specified in 3GPP TS 24.008; or C) in limited service state as specified in 3GPP TS 23.122 for reasons other than i), ii) or iii) above, and located in a geographical area for which the UE is provisioned with "non-operator managed" radio parameters as specified in subclause 5.2.4 of 3GPP TS 24.386;

2) the UE is authorized to use V2X communication over PC5 when the UE is not served by E-UTRAN for V2X communication as specified in subclause 5.2.4 of 3GPP TS 24.386; and 3) the V2X service identifier of the V2X service is included in the list of V2X services authorized for V2X communication over PC5 as specified in subclause 5.2.4 of 3GPP TS 24.386 or the UE is configured with a default destination Layer-2 ID for V2X communication over PC5 as specified in subclause 5.2.4 of 3GPP TS 24.386;

then the UE shall:

1) if the UE is configured with V2X service identifier to V2X frequency mapping rules for V2X communication over PC5 as specified in subclause 5.2.4 of 3GPP TS 24.386 and there is one or more V2X frequencies associated with the V2X service identifier of the V2X service for the V2X message in the current the geographical area, pass the one or more V2X frequencies associated with the V2X service identifier of the V2X service for the V2X message to the lower layers;

2) select radio resources for V2X communication over PC5 as specified in subclause 6.1.2.3 of 3GPP TS 24.386; and 3) perform transmission of V2X communication over PC5 as specified in subclause 6.1.2.2 of 3GPP TS 24.386;

else the UE shall not perform transmission of V2X communication over PC5.

The procedure, operation and method reflecting the proposal 2-1 and 2-3 are as follows.

6.1.2.1 Initiation

The upper layers can request the UE to send a V2X message of a V2X service identified by a V2X service identifier using V2X communication over PC5. The request from the upper layers includes:

a) the V2X message;

b) the V2X service identifier of the V2X service for the V2X message;

c) the type of data in the V2X message (IP or non-IP);

d) if the V2X message contains non-IP data, the V2X message family of data in the V2X message; and e) the V2X message priority.

Upon a request from upper layers to send a V2X message of a V2X service identified by a V2X service identifier using V2X communication over PC5, if the UE is configured with V2X service identifier to V2X frequency mapping rules for V2X communication over PC5 as specified in subclause 5.2.4 of 3GPP TS 24.386 and there is one or more V2X frequencies associated with the V2X service identifier of the V2X service for the V2X message in the current the geographical area, pass the one or more V2X frequencies associated with the V2X service identifier of the V2X service for the V2X message to the lower layers; or else if the UE is provisioned with radio parameters for the geographical area, pass the one or more provisioned carrier frequencies for V2X communication over PC5 associated with the current geographical area to the lower layers.

Upon receiving the carrier frequency the UE intend to use from lower layers, the UE shall proceed as follows:

a) if the following conditions are met:

1) the UE is served by E-UTRAN for V2X communication;

2) the UE intends to use the radio resources (i.e. carrier frequency) provided by an E-UTRAN cell;

3) the registered PLMN is in the list of PLMNs in which the UE is authorized to use V2X communication over PC5 when the UE is served by E-UTRAN for V2X communication as specified in subclause 5.2.4 of 3GPP TS 24.386; and 4) the V2X service identifier of the V2X service is included in the list of V2X services authorized for V2X communication over PC5 as specified in subclause 5.2.4 of 3GPP TS 24.386 or the UE is configured with a default destination Layer-2 ID for V2X communication over PC5 as specified in subclause 5.2.4 of 3GPP TS 24.386;
   then the UE shall:
   1) request radio resources for V2X communication over PC5 as specified in subclause 10.2.2 of 3GPP TS 24.334; and
   2) perform transmission of V2X communication over PC5 as specified in subclause 6.1.2.2 of 3GPP TS 24.386; and
  b) if the following conditions are met:
   1) the UE is:
   A) not served by E-UTRAN for V2X communication;
   B) in limited service state as specified in 3GPP TS 23.122, if the reason for the UE being in limited service state is one of the following;
     i) the UE is unable to find a suitable cell in the selected PLMN as specified in 3GPP TS 36.304;
     ii) the UE received an ATTACH REJECT message or a TRACKING AREA UPDATE REJECT message or a SERVICE REJECT message with the EMM cause #11 "PLMN not allowed" as specified in 3GPP TS 24.301 or a LOCATION UPDATING REJECT message or a GPRS ATTACH REJECT message or a ROUTING AREA UPDATE REJECT message or SERVICE REJECT message with the EMM cause #11 "PLMN not allowed" as specified in 3GPP TS 24.008; or
     iii) the UE received an ATTACH REJECT message or a TRACKING AREA UPDATE REJECT message or a SERVICE REJECT message with the EMM cause #7 "EPS services not allowed" as specified in 3GPP TS 24.301 or a LOCATION UPDATING REJECT message or a GPRS ATTACH REJECT message or a ROUTING AREA UPDATE REJECT message or a SERVICE REJECT message with the EMM cause #7 "GPRS services not allowed" as specified in 3GPP TS 24.008; or
   C) in limited service state as specified in 3GPP TS 23.122 for reasons other than i), ii) or iii) above, and located in a geographical area for which the UE is provisioned with "non-operator managed" radio parameters as specified in subclause 5.2.4 of 3GPP TS 24.386;
   2) the UE is authorized to use V2X communication over PC5 when the UE is not served by E-UTRAN for V2X communication as specified in subclause 5.2.4 of 3GPP TS 24.386; and
   3) the V2X service identifier of the V2X service is included in the list of V2X services authorized for V2X communication over PC5 as specified in subclause 5.2.4 of 3GPP TS 24.386 or the UE is configured with a default destination Layer-2 ID for V2X communication over PC5 as specified in subclause 5.2.4 of 3GPP TS 24.386;
   then the UE shall:
   1) select radio resources for V2X communication over PC5 as specified in subclause 6.1.2.3 of 3GPP TS 24.386; and
   2) perform transmission of V2X communication over PC5 as specified in subclause 6.1.2.2 of 3GPP TS 24.386;
   else the UE shall not perform transmission of V2X communication over PC5.

If the UE is camped on an E-UTRAN cell indicating that V2X communication over PC5 is supported by the network, but not broadcasting any carrier frequencies and radio resources for V2X communication over PC5 as specified in 3GPP TS 36.331, the UE shall request radio resources for V2X communication over PC5 as specified in subclause 10.2.2 of 3GPP TS 24.334.

The procedure, operation and method reflecting the proposal 2-2 are as follows.

6.1.2.3 Procedure for UE to Use Provisioned Radio Resources for V2X Communication Over PC5

When the UE is not served by E-UTRAN for V2X communication, the UE shall select the radio parameters to be used for V2X communication over PC5 as follows:
   if the UE can determine itself located in a geographical area, the UE is provisioned with radio parameters for the geographical area, and a carrier frequency the UE intend to use is selected in subclause 6.1.2.1 of 3GPP TS 24.386, the UE shall select the radio parameters associated with that geographical area and the selected carrier frequency the UE intend to use; or
   in all other cases, the UE shall not initiate V2X communication over PC5.

If the UE intends to use "non-operator managed" radio parameters as specified in subclause 5.2.4 of 3GPP TS 24.386, the UE shall initiate V2X communication over PC5 with the selected radio parameters.

If the UE intends to use "operator managed" radio parameters as specified in subclause 5.2.4 of 3GPP TS 24.386, before initiating V2X communication over PC5, the UE shall check with lower layers whether the selected radio parameters can be used in the current location without causing interference to other cells as specified in 3GPP TS 36.331, and:
   if the lower layers indicate that the usage would not cause any interference, the UE shall initiate V2X communication over PC5; or
   If the lower layers find that there exists a cell providing carrier frequencies or operating on carrier frequency which belong to the provisioned carrier frequency for V2X communication over PC5 that the UE intends to use, and the cell belongs to the registered PLMN or a PLMN equivalent to the registered PLMN, and the UE is authorized for V2X communication over PC5 in this PLMN, the UE can use the radio parameters indicated by the cell as specified in 3GPP TS 36.331.
   else if the lower layers report that one or more PLMNs providing carrier frequencies or operating on carrier frequency which belong to the provisioned carrier frequency for V2X communication over PC5 that the UE intends to use then:
   a) if the following conditions are met:
   1) none of the PLMNs reported by the lower layers is the registered PLMN or equivalent to the registered PLMN;
   2) at least one of the PLMNs reported by the lower layers is in the list of authorized PLMNs for V2X communication over PC5 and provides radio resources for V2X communication over PC5 as specified in 3GPP TS 36.331; and
   3) the UE does not have an emergency PDN connection;
     then the UE shall:
     1) if in EMM-IDLE mode, perform PLMN selection triggered by V2X communication over PC5 as specified in 3GPP TS 23.122; or
     2) else if in EMM-CONNECTED mode, either:
       i) perform a detach procedure as specified in 3GPP TS 24.301 and then perform PLMN selection triggered by V2X communication over PC5 as specified in 3GPP TS 23.122; or
       ii) not initiate V2X communication over PC5.

Whether the UE performs i) or ii) above is left up to UE implementation; or b) else the UE shall not initiate V2X communication over PC5.

If the registration to the selected PLMN is successful, the UE shall proceed with the procedure to initiate V2X communication over PC5 as specified in subclause 6.1.2.1 of 3GPP TS 24.386.

If the UE is performing V2X communication over PC5 using radio parameters associated with a geographical area and the selected carrier frequency the UE intend to use and moves out of that geographical area, the UE shall stop performing V2X communication over PC5 and then:

if the UE is not served by E-UTRAN for V2X communication or the UE intends to use radio resources for V2X communication over PC5 other than those operated by the serving E-UTRAN cell, the UE shall select appropriate radio parameters for the new geographical area as specified above; or if the UE is served by E-UTRAN for V2X communication and intends to use radio resources for V2X communication over PC5 operated by the serving E-UTRAN cell, the UE shall proceed with the procedure to initiate V2X communication over PC5 when served by E-UTRAN for V2X communication.

The procedure, operation and method reflecting the proposal 3-2 are as follows.

3.1C PLMN Selection Triggered by V2X Communication Over PC5

If the MS supports V2X communication over PC5 and needs to perform PLMN selection for V2X communication over PC5 as specified in 3GPP TS 24.386, then the MS shall proceed as follows:

i) the MS shall store a duplicate value of the RPLMN and a duplicate of the PLMN selection mode that were in use before PLMN selection due to V2X communication over PC5 was initiated, unless this PLMN selection due to V2X communication over PC5 follows another PLMN selection due to V2X communication over PC5 or a manual CSG selection as specified in subclause 4.4.3.1.3.3 of 3GPP TS 23.122;

ii) the MS shall enter into Automatic mode of PLMN selection as specified in subclause 4.4 of 3GPP TS 23.122 taking into account the additional requirements in items iii) to x) below;

iii) Among the PLMNs advertised by the E-UTRA cell providing carrier frequencies or operating on carrier frequency which belong to the provisioned carrier frequency for V2X communication over PC5 that the MS intends to use for V2X communication over PC5 as specified in 3GPP TS 24.385 or 3GPP TS 31.102, the MS shall choose one allowable PLMN which:

1) provides radio resources for V2X communication over PC5;

2) is in the list of authorised PLMNs for V2X communication over PC5 as specified in 3GPP TS 24.386; and 3) is not in the list of "PLMNs with E-UTRAN not allowed" as specified in subclause 3.1 of 3GPP TS 23.122;

if conditions 1) through 3) above are met then the MS shall attempt to register on that PLMN. If none of the PLMNs meet conditions 1) through 3) above, the MS shall return to the stored duplicate PLMN selection mode and use the stored duplicate value of RPLMN for further action;

iv) if the registration fails due to "PLMN not allowed" or "EPS services not allowed" as specified in 3GPP TS 24.386, then the MS shall update the appropriate list of forbidden PLMNs as specified in subclause 3.1 of 3GPP TS 23.122, and shall either:

A) if the PLMN provides common radio resources needed by the MS to do V2X communication over PC5 as specified in 3GPP TS 36.331, perform V2X communication over PC5 on the selected PLMN in limited service state. In this case the MS shall not search for available and allowable PLMNs during the duration of V2X communication over PC5;

B) return to the stored duplicate PLMN selection mode and use the stored duplicate value of RPLMN for further action; or C) perform the action described in iii) again with the choice of PLMNs further excluding the PLMNs on which the MS has failed to register.

Whether the MS performs A), B) or C) above is left up to MS implementation.

v) if the registration fails due to causes other than "PLMN not allowed" or "EPS services not allowed", the MS shall:

if the handling of the failure requires updating a list of forbidden PLMNs, update the appropriate list (as specified in 3GPP TS 24.301); and if the handling of the failure does not require updating a list of forbidden PLMNs (as specified in 3GPP TS 24.301), remember the PLMN as a PLMN on which the MS has failed to register;

and the MS shall either:

A1) return to the stored duplicate PLMN selection mode and use the stored duplicate value of RPLMN for further action;

B1) perform the action described in iii) again with the choice of PLMNs further excluding the PLMNs on which the MS has failed to register; or C1) perform V2X communication over PC5 in limited service state on a PLMN advertised by the cell operating in the radio resources provisioned to the MS for V2X communication over PC5 as specified in 3GPP TS 24.385 or 3GPP TS 31.102, if registration on this PLMN has previously failed due to "PLMN not allowed" or "EPS services not allowed" as specified in 3GPP TS 24.386 and if this PLMN provides common radio resources needed by the MS to do V2X communication over PC5 as specified in 3GPP TS 36.331. In this case the MS shall not search for available and allowable PLMNs during the duration of V2X communication over PC5;

Whether the MS performs A1), B1) or C1) above is left up to MS implementation.

vi) if the MS is no longer in the coverage of the selected PLMN, then the MS shall either:

A2) perform V2X communication over PC5 procedures for MS to use provisioned radio resources as specified in 3GPP TS 24.386; or B2) return to the stored duplicate PLMN selection mode and use the stored duplicate value of RPLMN for further action.

Whether the MS performs A2) or B2) above is left up to MS implementation.

vii) if the MS is unable to find a suitable cell on the selected PLMN as specified in 3GPP TS 24.386, then the MS shall either:

A3) if the PLMN provides common radio resources needed by the MS to do V2X communication over PC5 as specified in 3GPP TS 36.331, perform V2X communication over PC5 on the selected PLMN in limited service state. In this case the MS shall not search for available and allowable PLMNs during the duration of V2X communication over PC5; or B3) return to the stored duplicate PLMN selection mode and use the stored duplicate value of RPLMN for further action.

Whether the MS performs A3) or B3) above is left up to MS implementation.

viii) if the MS is switched off while on the selected PLMN and switched on again, the MS shall use the stored duplicate value of RPLMN as RPLMN and behave as specified in subclause 4.4.3.1 of 3GPP TS 23.122;

ix) if the user initiates a PLMN selection while on the selected cell, the MS shall delete the stored duplicate value of PLMN selection mode, use the stored duplicate value of RPLMN as RPLMN and follow the procedures in subclause 4.4.3.1 of 3GPP TS 23.122. The MS shall delete the stored duplicate value of RPLMN once the MS has successfully registered to the selected PLMN; and x) if the MS no longer needs to perform V2X communication over PC5, the MS shall return to the stored duplicate PLMN selection mode and use the stored duplicate value of RPLMN for further action.

If the MS returns to the RPLMN due to a failure to register in the selected PLMN, the upper layers of the MS can trigger PLMN selection again to initiate V2X communication over PC5.

If the PLMN selected for V2X communication over PC5 is a VPLMN, the MS shall not periodically scan for higher priority PLMNs during the duration of V2X communication over PC5.

The procedure reflecting proposals 3-1 and 3-2 is illustrated in FIG. 10 below.

FIG. 10 exemplifies a method for carrier frequency selection and cell/PLMN selection according to an embodiment of the present invention.

Referring to FIG. 10, the UE-ProSe layer may select the carrier frequency according to the second embodiment described above. This process may be omitted as described above.

Step 1) The UE-ProSe layer may provide service identifier or service type information to the lower layer together with the carrier frequency(s). The sequence number or bitmap information unique to each service type/identifier may be provided instead of the service identifier or service type.

The UE-ProSe layer may perform step 1 whenever every V2X message transmission is triggered. Alternatively, in order to reduce the signaling overhead, the UE-ProSe layer may performs step 1 only when there is a different carrier frequency from a set of carrier frequencies previously provided to the UE-RRC layer or step 1 only when a new service type occurs.

The UE-RRC layer may select the carrier frequency according to the second embodiment described above. This process may be omitted as described above.

Step 2) When no service identifier or service type information is given in step 1, the UE-RRC layer may perform step 2 for all carrier frequencies currently selected for transmission (for all services regardless of the service).

On the contrary, when the service identifier or service type information is given in step 1, the UE-RRC layer may perform step 2 for each service identifier or service type. In this case, the sequence number or bitmap information unique to each service type/identifier may be provided instead of the service identifier or service type.

In addition, the UE-RRC layer may perform step 2 every time step 1 is performed.

Alternatively, in order to reduce the signaling overhead, the UE-RRC layer does not perform step 2 every time step 1 is performed, but the UE-RRC layer may perform step 2 only when the selected carrier frequency is different from the previously selected carrier frequency.

Step 3) The UE-ProSe layer determines whether the UE is in the Served by E-UTRAN mode for the V2X communication via PC5 or in the Not served by E-UTRAN mode for the V2X communication via the PC5.

Step 4) When the UE is in the Not served by E-UTRAN mode, steps 4-B1 and 4-B2 are performed. On the contrary, when the UE is not in the Not served by E-UTRAN mode, steps 4-A1 and 4-A2 are performed.

First, a case in which the UE is not in the Not Served by E-UTRAN mode will be described.

Step 4-A1) The UE-ProSe layer transmits together the carrier frequency for transmission and the V2X message to be transmitted in the V2X communication via the PC5 to the UE-RRC layer.

In this case, the carrier frequency for transmission may be the same as the carrier frequency selected in step 2 above. Alternatively, when considering a fifth embodiment to be described below, the carrier frequency for transmission may be provided with an additional carrier frequency other than the carrier frequency selected in step 2 above.

Step 4-A2) The UE-RRC layer (i.e., lower layer) transmits the corresponding V2X message on the carrier frequency for transmission.

Next, a case in which the UE is in the Not Served by E-UTRAN mode will be described.

Step 4-B1) The UE-ProSe layer selects a radio parameter associated with the geographical area and the selected carrier frequency which the UE intends to use. A detailed description of this step is given in proposal 3-1.

Step 4-B2) The UE-ProSe layer determines whether the selected radio parameter may be used without causing interference.

In this case, the UE-ProSe layer may check with the UE-RRC layer whether the selected radio parameter may be used within the current position without causing interference (for another cell).

When the selected radio parameter may be used without causing interference, step 4-B2-a is performed. On the contrary, when the selected radio parameter may not be used without causing interference (i.e. when causing interference), steps 4-B2-b and 4-B2-b1 are performed.

Step 4-B2-a) The UE performs the V2X communication via the PC5 on the selected radio parameter. In FIG. 10, it is illustrated that only the UE-ProSe layer performs the V2X communication, but this is for the convenience of description and the UE-ProSe layer may perform the V2X communication via the PC5 through the UE-RRC layer.

Step 4-B2-b) The UE-RRC layer searches the cell/PLMN that provides the carrier frequency belonging to the provisioned carrier frequency for the V2X communication via the PC5 which the UE intends to use or that operates on the carrier frequency belonging to the provisioned carrier frequency for the V2X communication via the PC5 which the UE intends to use. The detailed description of this step is given in proposal 3-2 above.

Step 4-B2-b1) The UE-RRC layer performs the PLMN selection triggered by the V2X communication via the PC5, as defined in 3GPP TS 23.122. In addition, the UE-RRC layer searches the cell/PLMN that provides the carrier frequency belonging to the provisioned carrier frequency for the V2X communication via the PC5 which the UE intends to use or that operates on the carrier frequency belonging to the provisioned carrier frequency for the V2X communication via the PC5 which the UE intends to use. The detailed description of this step is given in proposal 3-2 above.

To perform steps 4-B2-a and 4-B2-b1 (i.e., to perform proposal 3-2), the UE-ProSe layer delivers a command/instruction to find the following cell to the UE-lower layer or the UE-RRC layer).

E-UTRAN cell which provides the carrier frequency belonging to the provisioned carrier frequency for the V2X communication via the PC5 which the MS intends to use or operates on the carrier frequency belonging to the provisioned carrier frequency for the V2X communication via the PC5 which the MS intends to use The lower layer (e.g., the UE-AS layer of the UE-RRC layer) receiving the notification informs the upper layer (i.e., the UE-ProSe layer) of the corresponding PLMN list information when finding the corresponding cell.

[Fourth embodiment] Configuration for 64 QAM or transmit (TX) diversity

In 3GPP, a solution for 64 QAM and benefits of a PC5 operation using the transmit diversity are discussed.

According to the work item (WID) of 3GPP, Release (Rel)-15 PC5 functionality can co-exist in the same resource pools as Rel-14 PC5 functionality. Thus, Rel-14 UE may receive sidelink transmissions from REL-15 UE on the shared resource pool. If the 64QAM or TX diversity is applied at the transmitter side when transmitting V2X messages over sidelink, the Rel-14 UE could not decode the received message transmitted using 64QAM and/or Tx diversity correctly.

In addition, from our view, 64QAM and/or Tx diversity is not mandatory feature even for Rel-15 V2X UEs. Some UEs may not support the 64QAM and/or Tx diversity. Then, the similar to Rel-14 UE, the Rel-15 UE which does not support 64QAM and/or Tx diversity could not decode the received message transmitted using 64QAM and/or Tx diversity correctly.

With this reasoning, the Rel-15 UE supporting 64QAM and/or Tx diversity should know whether or not a particular V2X service can be transmitted with 64QAM or TX diversity. As a basic assumption, the UE may determine whether 64QAM and/or TX diversity is applied depending on services. In other words, some services which should be understood by all V2X UEs should not use 64QAM or TX diversity. Other services for some subset of UEs can use 64QAM or TX diversity.

Observation 1: Rel-14 UE or Rel-15 UE not supporting 64QAM or TX diversity cannot receive REL-15 sidelink transmissions with 64QAM or TX diversity from Rel-15 UEs.

UE supporting 64QAM or TX diversity should know whether or not a particular V2X service can be transmitted with 64QAM or TX diversity.

From the AS layer point of view, in order to know whether or not a particular V2X service can be transmitted with 64QAM or TX diversity, a few options can be considered as follow.

Option 1: AS layer determines whether 64QAM or TX diversity is allowed for every packet based on the service information provided by upper layer Option 2: Upper layer provides, to AS layer, the information on whether 64QAM or TX diversity is allowed with every packet. The information can be different.

In order to implement the option 1, AS layer is required to store the information on whether the 64QAM or TX diversity is allowed for a certain service. For the service information provided by upper layer, the existing destination ID or PPPP can be considered. Alternatively, service ID which is available in the upper layer can be provided to AS layer for this purpose.

Option 2 is more aligned with the current Rel-14 mechanism, which is the frequency information is passed to AS layer for each packet.

In the case of the Option 2, UE-ProSe layer should have configuration for whether V2X service identifier is allowed to use the 64QAM or TX diversity for transmission (or high data rate transmission). For example, it can be implemented as follows.

5.2.4 Configuration Parameters for V2X Communication Over PC5

The configuration parameters for V2X communication over PC5 consist of:

a) an expiration time for the validity of the configuration parameters for V2X communication over PC5;

b) a list of PLMNs in which the UE is authorized to use V2X communication over PC5 when the UE is served by E-UTRAN;

c) an indication of whether the UE is authorized to use V2X communication over PC5 when the UE is not served by E-UTRAN;

d) per geographical area:

1) radio parameters for V2X communication over PC5 applicable when the UE is not served by E-UTRAN and is located in the geographical area, with an indication of whether these radio parameters are "operator managed" or "non-operator managed". The allowed "non-operator managed" radio parameters for V2X communication are defined in 3GPP TS 36.101 [19];

e) a list of the V2X services authorized for V2X communication over PC5. Each entry of the list contains:

1) a V2X service identifier; and 2) a destination Layer-2 ID;

e) a list of the V2X services authorized for V2X communication over PC5. Each entry of the list contains:

1) a V2X service identifier; and 2) a destination Layer-2 ID;

3) optionally, an indication for whether the V2X service identifier is allowed to use the 64QAM or TX diversity for transmission (or high data rate transmission)

The UE-ProSe layer checks the configuration. In case that the V2X service identifier is allowed to use the 64QAM or TX diversity for transmission (or high data rate transmission or high reliability transmission), when the UE-Prose perform transmission of V2X communication over PC5 as specified in subclause 6.1.2.2 of 3GPP TS 24.386, the UE-Prose pass the indication to the lower layer. For example, it can be implemented as follows. Alternatively, only the V2X service identifier and indication can be configured in separate configuration.

6.1.2.2 Transmission

The UE shall include the V2X message in a protocol data unit and pass it to the lower layers for transmission along with the following parameters:

a) a Layer-3 protocol data unit type set to:

1) IP packet, if the V2X message contains IP data; or 2) non-IP packet, if the V2X message contains non-IP data;

. . . .

g) if the UE is configured with PDB (Packet Delay Budget)-to-ProSe Per-Packet Priority mapping rules for V2X communication over PC5 as specified in subclause 5.2.4 of 3GPP TS 24.386, the PDB associated with the ProSe Per-Packet Priority as specified in subclause 5.2.4 of 3GPP TS 24.386, and h) if the UE is configured with an indication for whether the V2X service identifier is allowed to use the 64QAM or TX diversity for transmission (or high data rate transmission), the indication associated with the V2X service identifier of the V2X message The AS layer that receives it performs the following operations.

Based on the above procedure, if the transmitter UE transmits the V2X message using 64QAM and/or TX diversity, the receiver UE would try to decode the received messages. However, it would fail to decode the message. If the transmitter UE signals in sidelink control information (SCI) that the message will be transmitted with 64QAM and/or TX diversity, the receiver UE could avoid the unnecessary decoding.

Observation 2: It is beneficial that reception (RX) UE not supporting 64QAM and/or TX diversity avoids receiving Physical Sidelink Shared Channel (PSSCH) transmissions with 64QAM and/or TX diversity after receiving SCI.

With the observation above, the present invention proposes as follows:

TX UE indicates in SCI whether 64QAM and/or TX diversity is applied.

Fifth Embodiment

In the related art, when the UE-ProSe layer delivers the carrier frequency to the lower layer (for example, a UE-RRC layer), the lower layer selects one or more carrier frequencies to perform V2X transmission. In this case, the lower layer may select only one carrier frequency. Here, carrier frequency information transmitted by the UE-ProSe layer to the lower layer does not include information on whether transmission should be performed at a specific carrier frequency.

Hereinafter, an embodiment according to the present invention for solving the aforementioned problems will be described.

Option 1) Method performed in step 1 of FIG. 9 above

1. The carrier frequency information transmitted by the UE-ProSe layer to the lower layer may include an indication indicating whether the lower layer for each carrier frequency should transmit the carrier frequency information. That is, according to the indication, it may be indicated whether the UE-RRC layer should be used for each V2X transmission for each carrier frequency.

a) In a different method from the above method, the UE-ProSe layer may divide the carrier frequency information which the UE-ProSe layer should particularly transmit and carrier frequency information that is not necessarily transmitted and deliver the carrier frequency information to each lower layer.

2. The lower layer that receives the carrier frequency information needs to select the 'carrier frequency which should particularly transmit' at the time of selecting the carrier frequency and transmit the V2X message on the corresponding carrier frequency. When the V2X message needs to be transmitted at one or more carrier frequencies (i.e., when it is indicated that one or more carrier frequencies should be particularly transmitted for transmission), the V2X message may be copied and transmitted on each carrier frequency.

For the above operation, the indication may be configured as follows.

A. In the case of the above 1), the indication may be included in the V2X service identifier to V2X frequency mapping rules between the V2X service identifiers and the V2X frequencies with associated geographical areas for V2X communication over PC5.

B. In the case of the above 1-a), a branch representing the carrier frequencies that should be transmitted and those that do not may be included in the V2X service identifier to V2X frequency mapping rules between the V2X service identifiers and the V2X frequencies with associated geographical areas for V2X communication over PC5.

C. Alternatively, for the above 1) or 1-a), the indication may be generated in a new configuration. That is, a new configuration can be generated for the V2X service identifier and carrier frequency information that should be transmitted per current geographical area.

Option 2) Method performed in step 4 of FIG. 9 above

1. In addition to the selected carrier frequency provided in step 3 of FIG. 9 in the carrier frequency information for transmission conveyed to the lower layer by the UE-ProSe layer, a 'carrier frequency which needs to be additionally transmitted' may be included.

2. The lower layer receiving the included in the carrier frequency needs to transmit the corresponding V2X message on the carrier frequency included in the provided carrier frequency for transmission. When the V2X message needs to be transmitted at one or more carrier frequencies (i.e., when it is indicated that one or more carrier frequencies should be particularly transmitted for transmission), the V2X message may be copied and transmitted on each carrier frequency.

In the above 1), it may be recognized that the UE-ProSe layer has the 'carrier frequency which needs to be additionally transmitted' by the following method.

The above 1) needs to be implemented by the configuration. An available configuration implementation method is as follows.

For the above operation, the indication may be configured as follows.

A. the indication may be included in the V2X service identifier to V2X frequency mapping rules between the V2X service identifiers and the V2X frequencies with associated geographical areas for V2X communication over PC5.

B. a branch representing the carrier frequencies that should be transmitted and those that do not may be included in the V2X service identifier to V2X frequency mapping rules between the V2X service identifiers and the V2X frequencies with associated geographical areas for V2X communication over PC5.

C. Alternatively, the indication may be generated in a new configuration. That is, a new configuration can be generated for the V2X service identifier and carrier frequency information that should be transmitted per current geographical area.

When implemented as in A) or B) above, additional information may not be used prior to step 4 of FIG. 9 but may be used only during step 4.

FIG. 11 exemplifies a method for performing V2X communication according to an embodiment of the present invention.

Referring to FIG. 11, the UE receives a request for transmission of the V2X message from the upper layer (S1101).

That is, the UE receives the transmission request of the V2X message of the V2X service identified by the V2X service identifier using the V2X communication via the PC5 interface from the upper layer. In this case, the transmission request may include the V2X message, the V2X service identifier, and the like, as described above.

In addition, at the time of transmission of the transmission request, the upper layer (e.g., the UE-ProSe layer) may inform the lower layer (e.g., the UE-RRC layer) of the carrier frequency mapped with the service type. The detailed description thereof may be incorporated in the embodiment by referring to the third embodiment (see FIGS. 8 to 10) described above.

In this case, when the ongoing V2X service does not exist, the carrier frequency may be selected by the method according to the first embodiment above. Alternatively, when the ongoing V2X service exists, the carrier frequency may be selected by the method according to the second embodiment above.

Further, the carrier frequency selection may also be performed in the upper layer (for example, the UE-ProSe layer) or the lower layer (for example, the UE-RRC layer), as described above with reference to FIG. 9 or 10. When performed in the lower layer (e.g., the UE-RRC layer), the lower layer may deliver to the upper layer the selected carrier frequency information which the UE intends to use.

The UE checks a mode thereof (S1102).

That is, the UE checks whether the UE is served by the evolved universal terrestrial radio access network (E-UTRAN) (Served by E-UTRAN for V2X communication or Not Served by E-UTRAN for V2X communication).

In this case, the upper layer determines whether the UE is served by the evolved universal terrestrial radio access network (E-UTRAN), as in the third embodiment (see FIGS. 8 to 10) above and the upper layer may inform the lower layer of the carrier frequency for transmission. Further, although not illustrated in FIG. 11, the following steps according to FIG. 9 or 10 may be performed. The detailed description thereof may be incorporated in the embodiment by referring to the third embodiment (see FIGS. 8 to 10) described above.

When the UE is in the Served by the E-UTRAN for V2X communication mode, the UE requests the base station for the resource for the V2X communication via the PC5 interface, the UE may request the resource for the V2X communication via the PC5 interface or select the resource for the V2X communication via the PC5 interface in a resource pool pre-configured by the base station (S1103).

In this case, a condition in which the UE is regarded as being in the served by E-UTRAN for V2X communication mode or a condition in which the UE is regarded as being in the Not Served by E-UTRAN for V2X communication mode follows the aforementioned embodiment and the detailed description thereof will be omitted.

On the contrary, when receiving the transmission request of the V2X message, if the UE is in the Not Served by E-UTRAN for V2X communication mode, the UE selects the resource for the V2X communication via the PC5 interface (S1104).

The UE performs the transmission for the V2X communication via the PC5 interface (S1105).

Specifically, the UE may transmit the V2X message through the PC5 interface by transmitting the V2X message to the lower layer (e.g., the MAC layer and the PHY layer of the UE). With reference to the fourth embodiment, step S1105 will be described in detail with reference to the drawings.

FIG. 12 exemplifies a method for performing V2X communication according to an embodiment of the present invention.

Referring to FIG. 12, a UE (e.g., RRC layer) configures a mapping between a V2X service identifier and a transmission parameter (S1201).

Here, the transmission parameter may include a parameter indicating whether the Modulation and Coding Scheme (MCS) level of 64 QAM is applied or not.

Based on the configuration in S1101, the UE determines a transmission parameter associated with the V2X service identifier received from the upper layer (S1202). Then, the determined transmission parameters can be transmitted to the lower layer (e.g., MAC layer and/or PHY layer the UE) together with the V2X message.

The UE (e.g., the MAC layer) determines the MCS based on the transmission parameters received from the upper layer (e.g., the RRC layer) (S1203).

The UE (e.g., MAC layer and/or PHY layer) transmits a V2X message to another UE based on the determined MCS (S1204).

In particular, the PHY layer transmits the V2X message received from the upper layer through the sidelink (i.e., the PC5 interface) and in this case, the V2X message may be transmitted on the PSSCH. Further, the UE may transmit the SCI in the physical sidelink control channel (PSCCH) in order to inform the receiving UE of PSSCH scheduling information.

In addition, as described above, MCS level information may be transmitted while being included in the sidelink control information (SCI) so that a transmitting UE may successfully decode the V2X message received by the receiving UE.

Overview of Devices to which the Present Invention can be Applied

FIG. 13 illustrates a block diagram of a communication device according to an embodiment of the present invention.

With reference to FIG. 13, a wireless communication system comprises a network node 1310 and a plurality of UEs 1320.

A network node 1310 comprises a processor 1311, a memory 1312, and a transceiver 1313. The processor 1311 implements proposed functions, processes and/or methods proposed through FIGS. 1 to 12. The processor 1311 can implement layers of wired/wireless interface protocol. The memory 1312, being connected to the processor 1311, stores various types of information for driving the processor 1311. The transceiver 1313, being connected to the processor 1311, transmits and/or receives wired/wireless signals. Examples of the network node 1310 include eNB, MME, HSS, SGW, PGW, SCEF, SCS/AS and so on. In particular, in case the network node 1310 is an eNB, the transceiver 1313 can include a Radio Frequency (RF) unit for transmitting/receiving a radio signal.

The UE 1320 comprises a processor 1321, a memory 1322, and a transceiver (or RF unit) 1323. The processor 1321 implements proposed functions, processes and/or methods proposed through FIGS. 1 to 12. The processor 1321 can implement layers of wired/wireless interface protocol. The memory 1322, being connected to the processor 1321, stores various types of information for driving the processor 1321. The transceiver 1323, being connected to the processor 1321, transmits and/or receives wired/wireless signals.

The memory 1312, 1322 can be installed inside or outside the processor 1311, 1321 and can be connected to the processor 1311, 1321 through various well-known means. Also, the network node 1310 (in the case of an eNB) and/or the UE 1320 can have a single antenna or multiple antennas.

FIG. 14 illustrates a block diagram of a wireless communication device according to an embodiment of the present invention.

Particularly, in FIG. 14, the UE described above FIG. 13 will be exemplified in more detail.

Referring to FIG. 14, the UE includes a processor (or digital signal processor) 1410, an RF module (RF unit) 1435, a power management module 1405, an antenna 1440, a battery 1455, a display 1415, a keypad 1420, a memory 1430, a Subscriber Identification Module (SIM) card 1425 (which may be optional), a speaker 1445, and a microphone 1450. The UE may include a single antenna or multiple antennas.

The processor 1410 may be configured to implement the functions, procedures and/or methods proposed by the present invention as described in FIGS. 1 to 12. Layers of a wireless interface protocol may be implemented by the processor 1410.

The memory 1430 is connected to the processor 1410 and stores information related to operations of the processor 1410. The memory 1430 may be located inside or outside the processor 1410 and may be connected to the processors 1410 through various well-known means.

A user enters instructional information, such as a telephone number, for example, by pushing buttons of the keypad 1420 or by voice activation using the microphone 1450. The microprocessor 1410 receives and processes the instructional information to perform the appropriate function, such as to dial the telephone number. Operational data may be retrieved from the SIM card 1425 or the memory module 1430 to perform the function. Furthermore, the processor 1410 may display the instructional and operational information on the display 1415 for the user's reference and convenience.

The RF module 1435 is connected to the processor 1410, transmits and/or receives an RF signal. The processor 1410 issues instructional information to the RF module 1435, to initiate communication, for example, transmits radio signals comprising voice communication data. The RF module 1435 comprises a receiver and a transmitter to receive and transmit radio signals. An antenna 1440 facilitates the transmission and reception of radio signals. Upon receiving radio signals, the RF module 1435 may forward and convert the signals to baseband frequency for processing by the processor 1410. The processed signals would be transformed into audible or readable information outputted via the speaker 1445.

The present invention is applied to a 3GPP LTE/LTE-A systems is primarily described, but can be applied to various wireless communication systems in addition to the 3GPP LTE/LTE-A and 5G systems.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing vehicle-to-everything (V2X) communication by a user equipment (UE) in a wireless communication system, the method comprising:
   receiving, from an upper layer of the UE, a transmission request of a V2X message of a V2X service identified by a V2X service identifier;
   requesting or selecting radio resources for V2X communication over PC5 based on the UE being served or not being served by an evolved universal terrestrial radio access network (E-UTRAN) for V2X communication; and
   transferring, to a lower layer of the UE, the V2X message for performing transmission of the V2X communication over PC5,
   wherein the transmission request includes the V2X message and the V2X service identifier of the V2X service for the V2X message,
   wherein based on a transmission parameter related with the V2X service identifier, the transmission parameter is transferred to an AS (Access Stratum) layer with the V2X message,
   wherein the transmission parameter includes information for selecting a modulation and coding scheme (MCS) level of QAM, and
   wherein the MCS level is selected, by a Medium Access Control (MAC) layer of the UE, based on the transmission parameter related with the V2X service identifier.

2. The method of claim 1, wherein the V2X message of the V2X service is transmitted with QAM related with the transmission parameter.

3. The method of claim 1, wherein the upper layer of the UE has a configuration related with the transmission parameter.

4. The method of claim 1, wherein information of the selected MCS level is included in sidelink control information (SCI) and transmitted.

5. The method of claim 1, wherein the transmission request further includes carrier frequency information mapped with the V2X service identifier.

6. The method of claim 5, further comprising:
selecting a carrier frequency which the UE intends to use; and
transferring the selected carrier frequency to the upper layer.

7. The method of claim 6, wherein the V2X message is transmitted on the carrier frequency.

8. The method of claim 5, wherein the carrier frequency information mapped with the V2X service identifier includes information informing whether the carrier frequency information needs to be particularly used for each carrier frequency.

9. A user equipment (UE) for performing vehicle-to-everything (V2X) communication in a wireless communication system, the UE comprising:
a transceiver;
at least one processor; and
at least one computer memory operably connectable to the at least one processor and storing instructions that, when executed by the at least one processor, perform operations comprising:
receiving, via the transceiver, from an upper layer of the UE, a transmission request of a V2X message of a V2X service identified by a V2X service identifier,
requesting or selecting radio resources for V2X communication over PC5 based on the UE being served or not being served by an evolved universal terrestrial radio access network (E-UTRAN) for V2X communication, and
transferring, via the transceiver, to a lower layer of the UE, the V2X message for performing transmission of the V2X communication over PC5,
wherein the transmission request includes the V2X message and the V2X service identifier of the V2X service for the V2X message,
wherein based on a transmission parameter related with the V2X service identifier, the transmission parameter is transferred to an AS (Access Stratum) layer with the V2X message,
wherein the transmission parameter includes information for selecting a modulation and coding scheme (MCS) level of QAM, and
wherein the MCS level is selected, by a Medium Access Control (MAC) layer of the UE, based on the transmission parameter related with the V2X service identifier.

10. The UE of claim 9, wherein the V2X service is transmitted with QAM related with the transmission parameter.

11. The UE of claim 9, wherein the upper layer of the UE has a configuration related with the transmission parameter.

12. The UE of claim 9, wherein information of the selected MCS level is included in sidelink control information (SCI) and transmitted.

13. The UE of claim 9, wherein the transmission request further includes carrier frequency information mapped with the V2X service identifier.

14. The UE of claim 13, wherein the operations further comprise:
selecting a carrier frequency which the UE intends to use; and
transferring the selected carrier frequency to the upper layer.

15. The method UE of claim 14, wherein the V2X message is transmitted on the carrier frequency.

* * * * *